United States Patent
Li et al.

(10) Patent No.: US 12,420,266 B2
(45) Date of Patent: Sep. 23, 2025

(54) PROMOTED MIXED OXIDES FOR "LOW-TEMPERATURE" METHANE PARTIAL OXIDATION IN ABSENCE OF GASEOUS OXIDANTS

(71) Applicant: North Carolina State University, Raleigh, NC (US)

(72) Inventors: Fanxing Li, Raleigh, NC (US); Arya Shafiefarhood, Raleigh, NC (US); Amit Mishra, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 605 days.

(21) Appl. No.: 16/618,890

(22) PCT Filed: Jun. 5, 2018

(86) PCT No.: PCT/US2018/035973
§ 371 (c)(1),
(2) Date: Dec. 3, 2019

(87) PCT Pub. No.: WO2018/226635
PCT Pub. Date: Dec. 13, 2018

(65) Prior Publication Data
US 2021/0113996 A1    Apr. 22, 2021

Related U.S. Application Data

(60) Provisional application No. 62/515,169, filed on Jun. 5, 2017.

(51) Int. Cl.
*B01J 23/06* (2006.01)
*B01J 23/00* (2006.01)
(Continued)

(52) U.S. Cl.
CPC .......... *B01J 23/464* (2013.01); *B01J 23/002* (2013.01); *B01J 23/10* (2013.01); *B01J 23/34* (2013.01);
(Continued)

(58) Field of Classification Search
CPC ........ B01J 23/464; B01J 23/002; B01J 23/10; B01J 23/34; B01J 38/06; C01B 3/40;
(Continued)

(56) References Cited

U.S. PATENT DOCUMENTS

| 6,486,220 B1 | 11/2002 | Wright | |
|---|---|---|---|
| 2008/0164443 A1* | 7/2008 | White | B01J 23/002 252/373 |

(Continued)

FOREIGN PATENT DOCUMENTS

RU    2208475    7/2003

OTHER PUBLICATIONS

Machine translation of Ru 2,208,475 downloaded Jun. 16, 2022, pp. 1-9. (Year: 2022).*

(Continued)

*Primary Examiner* — Smita S Patel
(74) *Attorney, Agent, or Firm* — Thomas | Horstemeyer, LLP

(57) ABSTRACT

Redox catalysts are provided for "low-temperature" methane partial oxidation in absence of gaseous oxidants. Methods of converting the methane to syngas using the catalysts are also provided. In some aspects, the conversion takes place at temperatures of about 400° C. to about 950° C. The methods can be used to convert methane to syngas containing carbon monoxide and hydrogen gas. In some aspects, the methods are carried out in a fixed bed reactor with reverse flow.

26 Claims, 16 Drawing Sheets

(51) Int. Cl.

| | |
|---|---|
| *B01J 23/10* | (2006.01) |
| *B01J 23/34* | (2006.01) |
| *B01J 23/46* | (2006.01) |
| *B01J 23/96* | (2006.01) |
| *B01J 38/06* | (2006.01) |
| *C01B 3/40* | (2006.01) |
| *C01B 3/48* | (2006.01) |

(52) U.S. Cl.
CPC .............. *B01J 23/96* (2013.01); *B01J 38/06* (2013.01); *C01B 3/40* (2013.01); *C01B 3/48* (2013.01); *C01B 2203/0261* (2013.01); *C01B 2203/0283* (2013.01); *C01B 2203/1064* (2013.01); *C01B 2203/1082* (2013.01); *C01B 2203/1241* (2013.01)

(58) Field of Classification Search
CPC .............. C01B 3/48; C01B 2203/0261; C01B 2203/0283; C01B 2203/1064; C01B 2203/1082; C01B 2203/1241
USPC ........................................................ 252/373
See application file for complete search history.

(56) References Cited

U.S. PATENT DOCUMENTS

| | | | |
|---|---|---|---|
| 2015/0190796 A1 | 7/2015 | Bedel et al. | |
| 2016/0122670 A1* | 5/2016 | Klausner | B01J 19/02 422/162 |
| 2017/0001176 A1* | 1/2017 | D'Souza | B01J 37/0205 |

OTHER PUBLICATIONS

Combined oxides as oxygen-carrier material for chemical-looping with oxygen uncoupling. Magnus Ryden et al. Applied Energy, v113, p. 1924-1932 (Year: 2014).*
LaMnO3 Perovskite Supported Noble Metal Catalysts for the Total Oxidation of Methane. Lars Giebeler et al. Chem. Eng. Technol. v30, No. 7, p. 889-894 (Year: 2007).*
Partial oxidation of methane over Rh/supported-ceria catalysts: Effect of catalyst reducibility and redox cycles. Maria D. Salazar-Villalpando et al Int. j. Hydr. energy, v 33, p. 2695-2703 (Year: 2008).*
Wei, J. et al., "Structural requirements and reaction pathways in methane activation and chemical conversion catalyzed by rhodium," 2004, J. Catalysis, 225:116-127.
International Search Report and Written Opinion for PCT/US2018/035973 dated Sep. 20, 2018 (11pp).
Gao, K. et al., "Dynamic structural changes of perovskite-supported metal catalysts during cyclic redox treatments and effect on catalytic CO oxidation," 2013, Chinese J. Catalysis, 34:889-897.
Li. K. et al., "Syngas generation from methane using a chemical-looping concept: a review of oxygen carriers," 2013, J. Chem., 9pp.
Khine, M.S.S. et al., "Syngas production by catalytic partial oxidation of methane over (La0.7A0.3)BO3 (A = Ba, Ca, Mg, Sr, and B = Cr or Fe) perovskite oxides for portable fuel cell applications," 2013, Int. J. of Hydrogen Energy. 38:13300-13308.
Term Paper, "Catalytic Conversion of Methane by Steam," <https://knowledge.allbest.ru/3c0b65635a3ac68a5d53a89521216d27_1.html> Accessed Dec. 3, 2019, Author Not Known (original and machine translation).
Wang, G. et al., "Activation of methane by Rh(0): Evidence for direct insertion of rhodium into the C—H bond at cryogenic temperatures," 2005, Chem. Phys. Lett., 412:46-59.
Wang, H.Y. et al., "Partial oxidation of methane to synthesis gas over MgO- and SiO2-supported rhodium catalysts," 1999, J. Catalysis, 186:181-187.
US Energy Information Administration, "International Energy Outlook 2019," 2019, <http://www.ea.gov/ieo>, 85pp.

Tian, H. et al., "Effect of hydrogen sulfide on chemical looping combustion of coal-derived synthesis gas over bentonite-supported metal-oxide oxygen carriers," 2009, 48:8418-8430.
Tang, M. et al., "Progress in oxygen carrier development of methane-based chemical-looping reforming: A review," 2015, Applied Energy, 151:143-156.
Shah, K. et al., "Selection of suitable oxygen carriers for chemical looping air separation: A thermodynamic approach," 2012, Energy Fuels, 26:2038-2045.
Shafiefarhood, A. et al., "Iron-containing mixed-oxide composites as oxygen carriers for chemical looping with oxygen uncoupling (CLOU)," 2015, Fuel, 139:1-10.
Shafiefarhood, A. et al., "Methane partial oxidation using FeOx@La0.8Sr0.2FeO3-(delta) core-shell catalyst-transient pulse studies," 2015, Phys. Chem. Chem. Phys., 17:31297-31307.
Shafiefarhood, A. et al., "Fe2O3@LaxSr1-xFa)3 Core-Shell Redox Catalyst for Methane Partial Oxidation," 2014, ChemCatChem, 6:790-799.
Ryu, H.-J. et al., "Criteria for selection of metal component in oxygen carrier particles for chemical-looping combustor," 2004, Korean Chemical Engineering Research, 42:588-597 (abstract only).
Rostrup-Nielsen, J.R. et al., "CO2-Reforming of Methane over Transition Metals," 1993, J. Catalysis, 144:38-49.
Richardson, J.T. et al., "Carbon Dioxide Reforming of Methane with Supported Rhodium," 1990, Applied Catalysis, 61:293-309.
Otsuka. K. et al., "Direct partial oxidation of methane to synthesis gas by cerium oxide," 1998, J. Catalysis, 175:152-160.
Otsuka. K. et al., "Partial oxidation of methane using the redox of cerium oxide," 1993, Chem. Lett., 1517-1520.
Oller, A.R. et al., "Carcinogenicity assessment of selected nickel compounds," 1997, Toxicology and Appl. Pharmacol., 143:152-166.
Nomura, T. et al., "Microencapsulation of metal-based phase change material for high-temperature thermal energy storage," 2015, 5 (9pp).
Nomura, T. et al., "Performance analysis of heat storage of direct-contact heat exchanger with phase-change material," 2013, Applied Thermal Eng., 58:108-113.
Nomura, T. et al., "Heat storage in direct-contact heat exchanger with phase change material," 2013, Applied Thermal Eng., 50:26-34.
Nomura, T. et al., "Heat release performance of direct-contact heat exchanger with erythritol as phase change material," 2013, Applied Thermal Eng., 61:28-35.
Nishihata, Y. et al., "Self-regeneration of a Pd-perovskite catalyst for automotive emissions control," 2002, Nature, 416:164-167.
Neal, L. et al., "Effect of core and shell compositions on MeOx@LaySr1-yFeO3 core-shell redox catalysts for chemical looping reforming of methane," 2015, Applied Energy, 157:391-398.
Neal, L.M. et al., "Dynamic methane partial oxidation using a Fe2O3@La0.88r0.2FeO3-(delta) core-shell redox catalyst in the absence of gaseous oxygen," 2014, ACS Catalysis, 4:3560-3569.
Mishra, A. et al., "Perovskite-structured AMnxB1-xO3 (A = Ca or Ba; B = Fe or Ni) redox catalysts for partial oxidation of methane," 2016, Catal. Sci. Technol., 6:4535-4544.
Mattisson, T. et al., "The use of NiO as an oxygen carrier in chemical-looping combustion," 2006, Fuel, 85:736-747.
Mallens, E.P.J. et al., "The reaction mechanism of the partial oxidation of methane to synthesis gas: a transient kinetic study over rhodium and a comparison with platinum," 1997, J. Catalysis, 167:43-56.
Luo, S. et al., "Shale gas-to-syngas chemical looping process for stable shale gas conversion to high purity syngas with a H2:CO ratio of 2:1," 2014, Energy Environ. Sci., 7:4104-4117.
Kang, K.-S. et al., "Redox cycling of CuFe2O4 supported on ZrO2 and GeO2 for two-step methane reforming/water splitting," 2010, Int. J. Hydrogen Energy, 35:568-576.
Kang, K.-S. et al., Oxygen-carrier selection and thermal analysis of the chemical-looping process for hydrogen production,° 2010, Int. J. Hydrogen Energy, 35:12246-12254.
Imtiaz, Q. et al., "Review of oxygen carriers for chemical looping with oxygen uncoupling (CLOU): thermodynamics, material development, and synthesis," 2013, Energy Technol., 1:633-647.

(56) References Cited

OTHER PUBLICATIONS

Hu, Y.H. et al., "Catalytic conversion of methane to synthesis gas by partial oxidation and CO2 reforming." 2004, Adv. Catal., 48:297-345.

Hedayati, A. et al., "Evaluation of novel ceria-supported metal oxides as oxygen carriers for chemical-looping combustion," 2012, Ind. Eng. Chem. Res., 51:12796-12806.

Gu, Z. et al., "Syngas production from methane over CeO2—Fe2O3 mixed oxides using a chemical-looping method." 2013, Kinetics and Catalysis, 54:326-333.

Gayan, P. et al., "Effect of support on reactivity and selectivity of Ni-based oxygen carriers for chemical-looping combustion," 2008, Fuel, 87:2641-2650.

Garcia-Labiano, F. et al., "Effect of fuel gas composition in chemical-looping combustion with Ni-based oxygen carriers. 1. Fate of sulfur," 2009, Ind. Eng. Chem. Res., 48:2499-2508.

Galinsky, N.L. et al., "Effect of support on redox stability of iron oxide for chemical looping conversion of methane," 2015, Applied Catalysis B: Environmental, 164:371-379.

Galinsky, N. et al., "Ca1-xAxMnO3 (A = Sr and Ba) perovskite based oxygen carriers for chemical looping with oxygen uncoupling (CLOU)," 2015, Applied Energy, 157:358-367.

Galinsky, N.L. et al., "Iron oxide with facilitated O2- transport for facile fuel oxidation and CO2 capture in a chemical looping scheme," 2013, ACS Sustainable Chem. Eng., 1:364-373.

Fan, M.-S. et al., "Catalytic technology for carbon dioxide reforming of methane to synthesis gas," 2009. ChemCatChem, 1:192-208.

Erdohelyi, A. et al., "Activation of CH4 and its reaction with CO2 over supported Rh catalysts," 1993, J. Catalysis, 141:287-299.

Chung, W.-C. et al., "Review of catalysis and plasma performance on dry reforming of CH4 and possible synergistic effects," 2016, renewable and Sustainable Energy Rev., 62:13-31.

Cho, P. et al., "Carbon formation on nickel and iron oxide-containing oxygen carriers for chemical-looping combustion," 2005, Ind. Eng. Chem. Res., 44:668-676,.

Bhavsar, S. et al., "Lanthana-doped ceria as active support for oxygen carriers in chemical looping combustion," 2016, Applied Energy, 168:236-247.

Belliere, V. et al., "Phase segregation in cerium-lanthanum solid solutions," 2006, J. Phys. Chem. B, 110:9984-9990.

Au, C.T. et al., "Mechanistic studies of methane partial oxidation to syngas over SiO2-supported rhodium catalysts," 1997, J. Catalysis, 167:337-345.

Alvarez-Galvan, M.C. et al., "Direct methane conversion routes to chemicals and fuels," 2011, Catalysis Today, 171:15-23.

Adanez, J. et al., "Progress in chemical-looping combustion and reforming technologies," 2012, Progress in Energy and Combustion Sci., 33:215-282 (3 files).

Adanez, J. et al., "Selection of oxygen carriers for chemical-looping combustion," 2004, Energy and Fuels, 18:371-377.

Zhang, J. et al., "Coke-resistant Ni@SiO2 catalyst for dry reforming of methane," 2015, Applied Catalysis B: Environmental, 176-177:513-521.

Zhang, K. et al., "Research progress and materials selection guidelines on mixed conducting perovskite-type ceramic membranes for oxygen production," 2011, RSC Advances, 1:1661-1676.

Zhang, Z.L. et al., "Reforming of methane with carbon dioxide to synthesis gas over supported rhodium catalysts," 1996, J. Catalysis, 158:51-63.

* cited by examiner

Step 1 (Reduction):
$CH_4$ + RC-Oxidized → $2H_2$ + CO + RC-Reduced

Step 2 (Regeneration):
Configuration 1: RC-Reduced + Air → RC-Oxidized + Heat *(no external thermal energy required)*
Configuration 2: RC-Reduced + $H_2O/CO_2$ → $H_2$/CO + RC-Oxidized *(solar thermal input needed)*

PROMOTED MIXED OXIDES FOR "LOW-TEMPERATURE" METHANE PARTIAL OXIDATION IN ABSENCE OF GASEOUS OXIDANTS

CROSS-REFERENCE TO RELATED APPLICATIONS

This application claims priority to, and the benefit of, U.S. provisional application entitled "PROMOTED MIXED OXIDES FOR "LOW-TEMPERATURE" METHANE PARTIAL OXIDATION IN ABSENCE OF GASEOUS OXIDANTS" having Ser. No. 62/515,169, filed Jun. 5, 2017, the contents of which are incorporated by reference in their entirety.

STATEMENT REGARDING FEDERALLY SPONSORED RESEARCH OR DEVELOPMENT

This invention was made with government support under grant number 1254351 awarded by the National Science Foundation. The government has certain rights to this invention.

TECHNICAL FIELD

The present disclosure generally relates to mixed metal oxide catalysts for the partial oxidation of methane to syngas.

BACKGROUND

Methane, the primary component of natural gas, is the most abundant organic compound on earth. Its relative abundance and lower $CO_2$ emission compared to petroleum and coal has led to renewed interests in conversion of methane to value-added products such as liquid transportation fuels and chemicals. Although direct conversions of methane to chemicals such as oxygenates, olefins, and aromatics have been extensively investigated within the scientific community, they have yet to demonstrate feasible product yields from an economics viewpoint. To date, commercial methane volarization processes are exclusively based on indirect approaches: methane is first reformed into syngas, i.e. a mixture of CO and $H_2$; subsequently, the syngas stream is conditioned and converted into desired products. As a crucial first step, methane reforming is both capital intensive and inefficient due to coke formation, catalyst deactivation, high endothermicity and steam requirements, and/or the needs for air separation units (ASU).

Compared to conventional methane reforming, chemical looping reforming (CLR) offers a potentially more efficient route that eliminates the need of ASU. This is realized through a redox active oxygen carrier, a.k.a. redox catalyst, which incorporates oxygen from the air into its lattice. The active lattice oxygen is subsequently donated for methane partial oxidation (POx). Two interconnected reactors are used to complete such a cyclic redox process. Due to its importance for CLR, numerous research efforts have been devoted to selection and synthesis of more active and selective redox catalysts. A typical redox catalyst is composed of an oxygen reservoir, which is commonly a first row transition metal oxide, and an inert support to increase its stability and oxygen mobility. Although proven to be effective, the aforementioned oxides face such challenges as high cost, low activity and/or limited selectivity. Nickel based oxides are one of the more extensively studied materials. Their application, however, is hindered due to high cost, health and environmental concerns, and coking and sulfur poisoning issues. The use of iron and manganese based oxide can be advantageous as they are abundant and environmentally benign, but they exhibited low syngas selectivity. Our recent studies showed that mixed metal oxides, such as perovskites, can be used as supports to both increase the mechanical integrity of the oxygen reservoir and provide metallic catalytic sites for methane partial oxidation. It is noted that such catalytic sites only present in (partially) reduced redox catalysts. Moreover, partially exposed iron oxide phases negatively impacts the methane to syngas selectivity.

To improve the selectivity of the redox catalysts, two potential strategies can be adopted. The first approach is thermodynamically inhibiting over-oxidation by designing redox catalysts with suitable equilibrium oxygen partial pressures ($P_{O2}$). Several recent studies reported improved syngas selectivity using oxygen carriers and reactor configurations that are thermodynamically selective. The second approach is to prepare redox catalysts with more selective surfaces. One example is the core-shell structured redox catalysts with nonselective oxygen reservoir as the core and selective perovskite phase as the shell. The selectivity of such redox catalysts, however, is limited by their surface oxidation state, which is determined by relative rates of bulk lattice oxygen diffusion and surface oxygen removal. The surface (or loosely bonded) oxygen species of oxidized redox catalysts were found to be responsible for the non-selective combustion reactions. This leads to a non-selective region at the beginning of the methane oxidation reaction. Although partially reoxidizing the core-shell redox catalyst can significantly enhance the syngas selectivity, it reduces the overall oxygen carrying capacity and increases the process complexity. Most redox catalysts reported to date also requires high operating temperatures (>800° C.), this is primarily due to the low surface activity for methane activation and the high activation energy required for lattice oxygen and/or cation migrations. There remains a need for improved redox catalysts and methods of use thereof that overcome the aforementioned deficiencies.

BRIEF DESCRIPTION OF THE DRAWINGS

Further aspects of the present disclosure will be readily appreciated upon review of the detailed description of its various embodiments, described below, when taken in conjunction with the accompanying drawings.

DETAILED DESCRIPTION

Figure 1A:
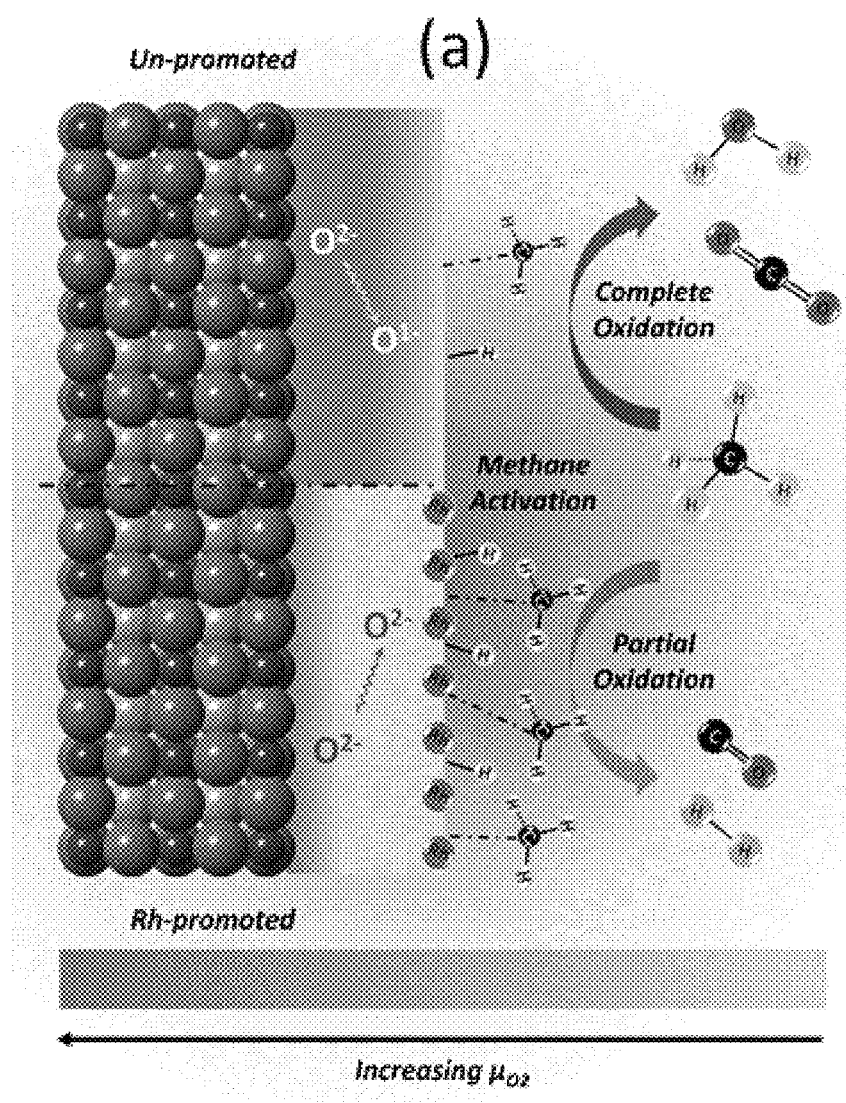
FIG. 1A is a schematic of the redox catalyst surface during the methane partial oxidation step.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Redox Catalysts

Promoted ceramic mixed metal oxides are provided for partial oxidation of methane to syngas (CO+$H_2$). The platinum group-promoted mixed oxides are tailored to possess chemical and mechanical stability, superior syngas selectivity and most importantly, high redox activity at low temperatures (down to 500° C.). These mixed oxides are generally used for cyclic redox conversion of commodity fuels such as natural gas, coal, biomass, etc into value-added, environmentally friendly products such as hydrogen, synthesis gas, electricity, and other chemicals or fuels. Addition of the platinum group promoter enhances the selectivity of these oxides toward partial oxidation products and make the process more energy efficient by reducing the operating temperature, in some aspects, by more than 300° C.

Redox catalyst are provided including a perovskite, Brownmillerite, double perovskite, or layered perovskite (Ruddlesden-Popper, Aurivillius, and Dion-Jacobson phases) promoted with a platinum-group promoter. For example, a redox catalyst is provided having a perovskite having a formula selected from the group consisting of $Ca_xA_{1-x}Mn_yB_{1-y}O_{3-\delta}$, $Ba_xA_{1-x}Mn_yB_{1-y}O_{3-\delta}$, and $La_xA_{1-x}Fe_yB_{1-y}O_{3-\delta}$, $Ca_\alpha A_{2-\alpha}Mn_yB_{1-y}O_{4-\delta}$, $Sr_\alpha A_{2-\alpha}Fe_yB_{1-y}O_{4-\delta}$, $Sr_xA_{2-x}Fe_yMn_zB_{2-y-z}O_{6-\delta}$, $(Sr/A)_{n+1}(Fe/Mn/B)_nO_{3n+1-\delta}$ and a combination thereof, wherein the perovskite has an outer surface with about 5 wt. % or less of a platinum-group metal based upon a total weight of the redox catalyst. The same principle of platinum group metal promotion of redox active oxides can be applied to other mixed metal oxides containing first-row transition metal and/or ceria with variable oxidation states. Examples of such metal oxides include mixed Fe—Cu, Fe—Mn, Mn—Mg, Mn—Si, Fe—Si, Mn—Cu, La—Ce, Pr—Ce oxides.

In some aspects, A is independently an alkali-earth or rare-earth metal or a combination thereof. In some aspects, A is selected from the group Ca, Sr, Ba, La, Pr, and a combination thereof.

Each occurrence of B can be independently selected from the group Fe, Mn, Al, Ti, Mg, Ce, Co, Cr, V, Mo, W, and a combination thereof.

Each occurrence of x can be about 0.0 to 1.0, about 0.0 to 0.5, e.g. about 0, about 0.05, about 0.1, about 0.15, about 0.2, about 0.25, about 0.3, about 0.35, about 0.4, about 0.45, or about 0.5. Each occurrence of y can be about 0.0 to 1.0, about 0.0 to 0.5, e.g. about 0, about 0.05, about 0.1, about 0.15, about 0.2, about 0.25, about 0.3, about 0.35, about 0.4, about 0.45, or about 0.5. Each occurrence of z can be about 0.0 to 1.0, about 0.0 to 0.5, e.g. about 0, about 0.05, about 0.1, about 0.15, about 0.2, about 0.25, about 0.3, about 0.35, about 0.4, about 0.45, or about 0.5. Each occurrence of a can be about 0.0 to 2.0, about 0.0 to 1.0, about 1.0 to 2.0, about 0.5 to 1.5, about 0.5 to 1.0, about 1.0 to 1.5, about 1.5 to 2.0, or about 0.0 to 0.5.

The platinum-group metal can be any platinum-group metal. In some aspects, the platinum-group metal is Rhodium. In some aspects, the platinum-group metal can be Platinum, Osmium, Iridium, Ruthenium Palladium, and mixture thereof. In some aspects, the platinum-group metal is present in an amount from about 0.005 wt. % to about 2.0 wt. % by weight based upon the total weight of the redox catalyst.

Methods of Using Redox Catalysts

A variety of methods of using the redox catalysts described herein are also provide. The methods can include converting methane to syngas, for example by contacting the methane with a redox catalyst described herein to produce the syngas. The methane can be contacted with the redox catalyst at a temperature of about 400° C. and above, e.g. about 400° C. to about 600° C. or about 500° C. to about 600° C.

In one aspect, a method of converting methane to syngas comprises contacting the methane with a redox catalyst to produce the syngas,
  wherein the redox catalyst comprises metal cations and is (1) a cerium containing oxide or (2) a perovskite oxide comprising La, Ba, Sr, Ca, or any combination thereof;
  wherein the redox catalyst is in a fixed bed reactor having a first end and a second end;
  wherein the redox catalyst nearest the first end is initially at a first high average oxidation state and the redox catalyst nearest the second end is initially at a second low average oxidation state lower than the first high average oxidation state, and
  wherein the method comprises:
  (1) introducing the methane into the fixed bed reactor near the first end for a first period of time; wherein the methane contacts the redox catalyst in the first high average oxidation state near the first end of the fixed bed reactor; and
  wherein after the first period of time the redox catalyst nearest the first end is in a third low average oxidation state;
  (2) introducing a first amount of an oxidant into the fixed bed reactor near the second end for a second period of time; and
  wherein after the second period of time the redox catalyst near the second end is in a fourth high average oxidation state higher than the third low average oxidation state;
  (3) introducing the methane into the fixed bed reactor near the second end for a third period of time; wherein the methane contacts the redox catalyst in the fourth high average oxidation state near the second end of the fixed bed reactor; and
  wherein after the third period of time the redox catalyst nearest the second end is in a fifth low average oxidation state; and
  (4) introducing a second amount of the oxidant into the fixed bed reactor near the first end for a fourth period of time; and
wherein after the fourth period of time the redox catalyst near the first end is in a sixth high average oxidation state higher than the fifth low average oxidation state.

The methods can include using a variety of reactors. For example, the redox catalyst can be in a circulating fluidized bed or moving bed reactor. The redox catalyst can be in a fixed bed reactor or a simulated moving bed reactor.

The methods can include regenerating the redox catalyst by contacting the redox catalyst with air to regenerate the redox catalyst. The methods can include regenerating the redox catalyst by contacting the redox catalyst with water and carbon dioxide in the presence of an external energy source. For example, the external energy source can be solar thermal radiation or industrial waste heat.

In some aspects, the regeneration step produces $H_2$, CO, or a mixture thereof. The $H_2$, CO, or mixture thereof can be combined with the syngas to produce a syngas having a hydrogen to CO ratio of about 2:1. The syngas can then be used for producing liquid hydrocarbons using a Fisher-Tropsch synthesis In some aspects, the redox catalyst is in multiple coupled fixed-bed reactors, and the method further includes alternating feed streams between (1) a first feed stream including the methane, and (2) a second feed stream including air, carbon dioxide, water, or a mixture thereof. Contacting the redox catalyst with the second feed stream can regenerate the redox catalyst and/or produce $H_2$, CO, or a mixture thereof.

The redox catalysts can have improved surface catalytic activity and/or enhanced redox activity at significantly lower temperatures than the corresponding perovskite catalysts except without the platinum-group metal on the surface. The platinum group promoters can be readily reducible and highly effective for methane activation. Although these metals are active for methane combustion under oxidizing environments, the $O_2$ free environment in CLR can allow for high methane conversion activity and syngas selectivity. Mixed-oxides with different equilibrium $P_{O_2}$s, including perovskites such as $Ca_xA_{1-x}Mn_yB_{1-y}O_{3-\delta}$ (with A being Sr, Ba, La, Pr, or other rare earth metal or combination thereof, and B being Fe, Al, Ti, Mg, Ce, Co, Cr, V, Mo, W or combination thereof), and fluorite-structured materials such as $CeO_2$, and $LaCeO_{3.5}$ can show enhancements upon addition of the surface promoters. Since these mixed oxides possess both redox activity and mixed conductive properties, they are highly recyclable without inert support.

Figure 1B:
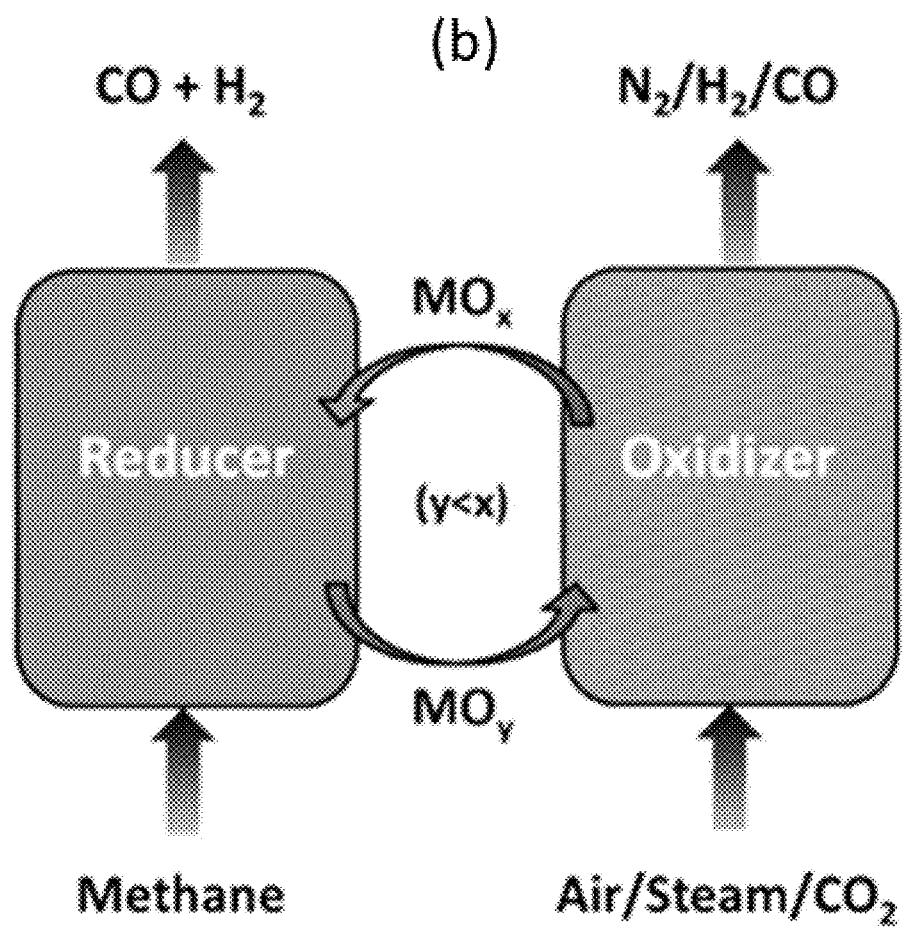
FIG. 1B is a generalized schematic of the chemical looping reforming (CLR) process.
Figure 2:
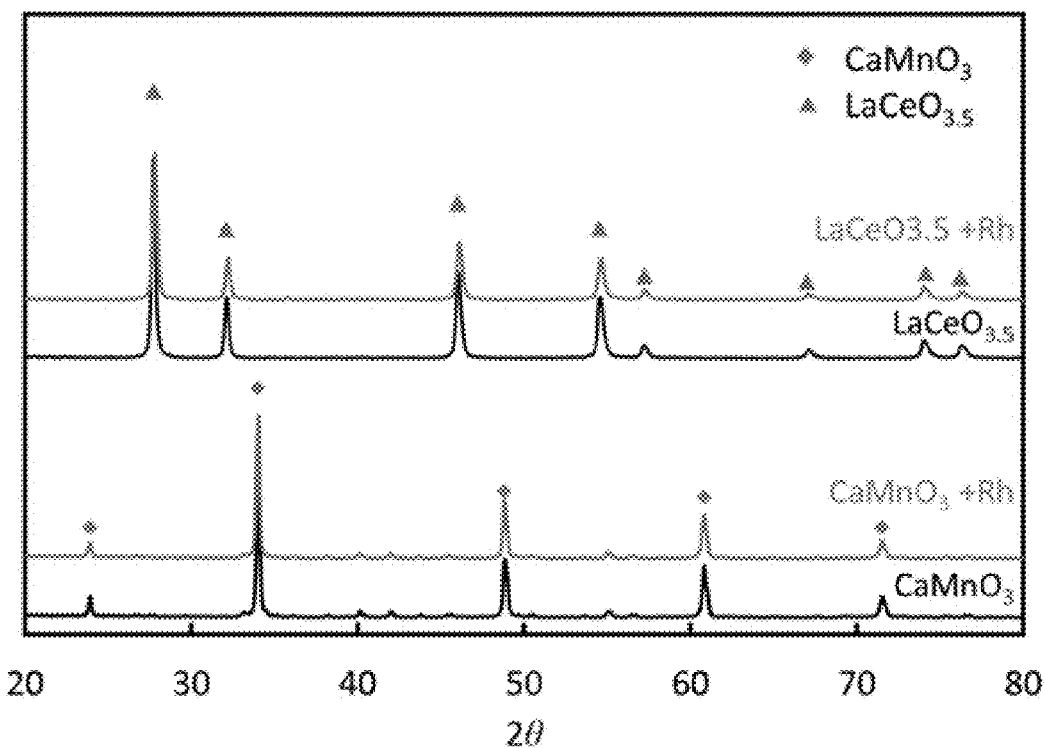
FIG. 2 is a graph of the X-ray diffraction (XRD) patterns of as-prepared unpromoted and Rh-promoted $CaMnO_3$ (bottom curves) and $LaCeO_{3.5}$ (top curves).

This strategy and its application to convert methane to syngas is illustrated in FIG. 1. As can be seen, this strategy combines the advantages the CLR process with highly catalytic properties of platinum group metals. Presence of surface promoters facilitates the methane activation, especially at lower temperatures, which leads to presence of more activated species on the surface of the redox catalyst which are very effective at withdrawing lattice oxygen. The lattice oxygens from the bulk of the catalyst are shuttled through the material to replenish the near surface oxygens withdrawn. This continues until the bulk of the catalyst cannot provide further oxygen atoms. In a subsequent regeneration step, oxygen consumed in the partial oxidation step is replenished by air/$H_2O$/$CO_2$ (FIG. 1b) in a separate reactor. Compared to conventional methane partial oxidation and reforming schemes, this strategy is significantly more energy efficient due to elimination of the air separation unit and the high steam requirements. Additionally, re-oxidizing the oxygen carriers in air during the regeneration steps proceeds through an exothermic reaction which provides the most of the energy requirements of the overall process. Use of steam or $CO_2$ as oxidant for re-oxidizing the redox catalysts, on the other hand, results if coproduction of $H_2$ and CO respectively Our results indicate that the relative rates of lattice oxygen ($O^{2-}$) conduction to the surface and the surface oxygen removal by the gas-solids reactions, determines the selectivity of the redox catalysts. This is particularly the case at the early stage of the reaction. Presence of Rh on the surface increases the oxygen removal rate from the surface and hence inhibits the formation of nonselective surface oxygen species. This is realized by the enhancement of methane activation and hence more effective oxygen removal from the surface. It is also noted that the rate of bulk lattice oxygen diffusion controls the overall reaction rate for later stages of the reaction. Such a diffusion rate can be notably affected by the surface of the redox catalysts, which provides the driving force for $O^{2-}$ conduction. As such, Rh-promoter significantly increases the activity of the catalysts at lower temperatures. For instance, Rh-promoter reduces the onset temperature of POx reaction by up to 300° C. While un-promoted $CaMnO_3$ exhibits very low activity/selectivity at below 800° C., the promoted sample exhibited a maximum CO yield at 600° C. with CO selectivity above 86% and remained active at 500° C. Although $LaCeO_{3.5}$ exhibits high syngas selectivity at high temperatures (900° C.), it suffers from slow kinetics and becomes significantly less active at below 800° C. Promoting the $LaCeO_{3.5}$ with Rh not only improve the kinetics at high temperatures, but also reduced the onset temperature for methane conversion to 600° C.

Methods provided can include using $CaMnO_3$, $BaMnO_3$, and $LaFeO_3$-based redox catalysts described herein with small amounts of platinum group metal promoters to selectively convert methane to syngas at low temperatures (500-600° C.) in a conventional CLR process (FIG. 11, Configuration 1) with circulating fluidized bed or moving bed reactors. Air can be used as the oxidant to regenerate the redox catalysts after reaction with methane. The redox catalyst regeneration is an exothermic reaction which provides the energy requirement of the process. The heat generated can be stored in the redox catalysts and transferred to the fuel reactor.

Figure 11:
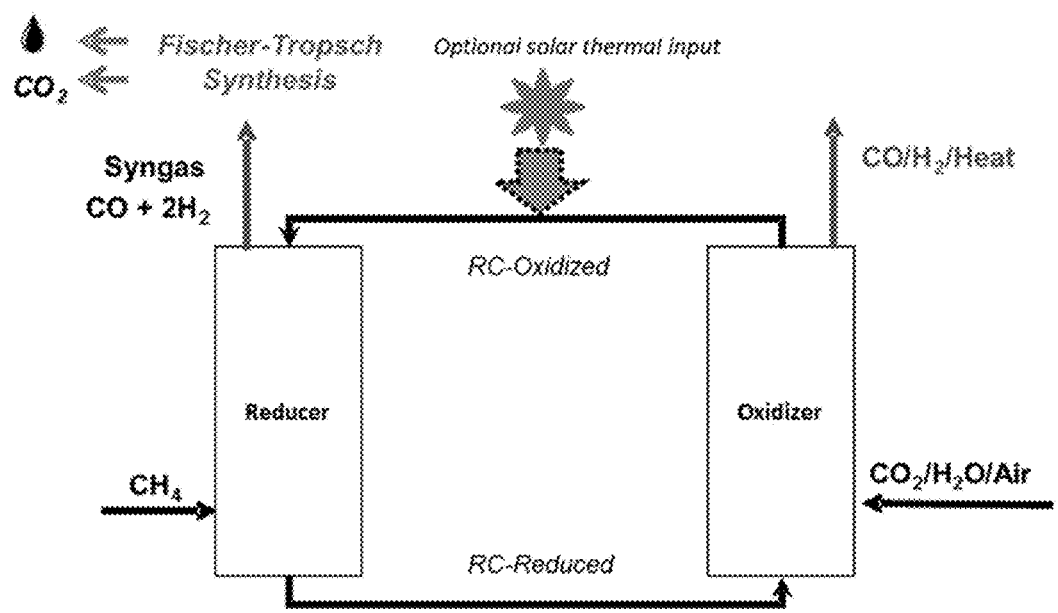
FIG. 11 is a schematic of chemical looping reforming (CLR) with fluidized/moving bed reactors to circulate the redox catalysts between the two reactors. Configuration 1: Conventional CLR with air as the oxidant. Configuration 2: Use of steam/carbon dioxide for H2/CO co-production.

The methods can include use of steam and/or carbon dioxide as oxidant to regenerate the redox catalysts in a similar process described above. This can lead to co-production of $H_2$ and/or CO which can be used in a separate stream or mixed with the syngas to produce desirable 2:1 hydrogen to CO ratio (FIG. 11, Configuration 2). This process can require an external energy source due to endothermicity of the regeneration step.

The methods can include integration of solar energy in the processes described above for a hybrid solar-thermal hydrogen and syngas production (FIG. 11, Configuration 2 with solar thermal input).

Figure 12:
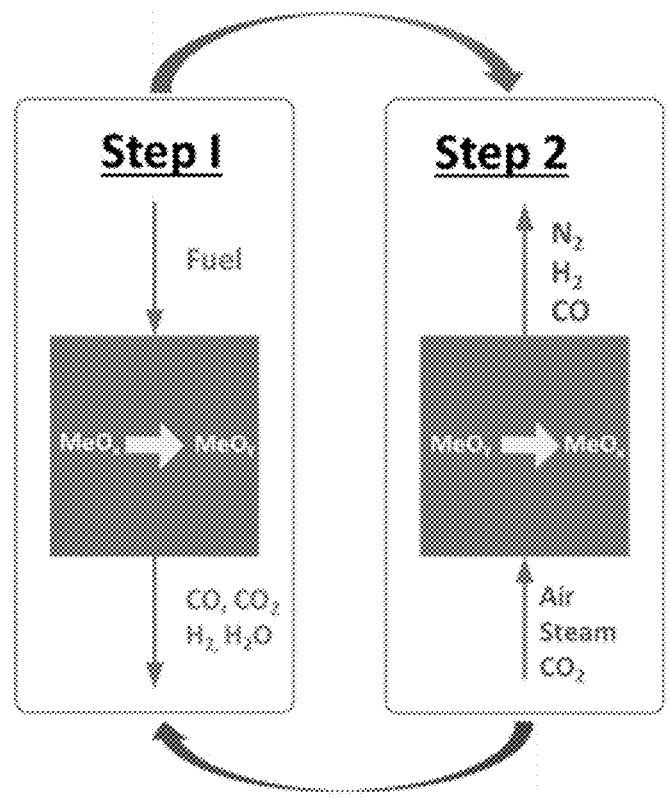
FIG. 12 is a schematic of chemical looping reforming (CLR) with fixed-bed reactors and alternating fuel and oxidant streams.

The methods can include use of fixed bed reactors and alternating the feed stream between multiple coupled reactors similar to the industrially proven Houdry process (FIG. 12).

Figure 13:
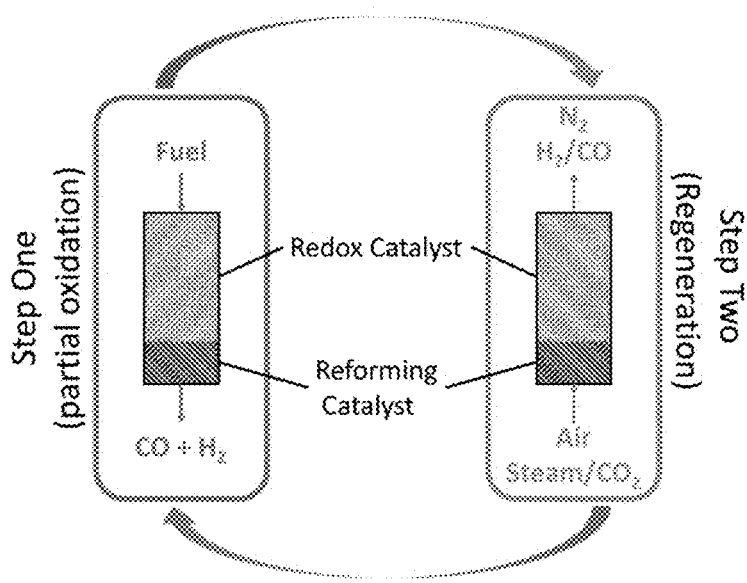
FIG. 13 is a schematic of chemical looping reforming (CLR) with a dual fixed-bed reactors and alternating fuel and oxidant streams for enriched syngas stream.

The methods can include addition of a dry/steam reforming catalyst bed to the methods described above to convert $CO_2$ and unreacted methane to CO and $H_2$ and enrich the syngas in the product stream (FIG. 13). Conventional reforming catalyst beds are active in the reduced state. Therefore, they can be more reducible than the main redox catalyst bed. Mixed of noble metals such as Pt, Rh, and Ru supported on oxides such as $TiO_2$, $La_2O_3$, $CeO_2$, $ZrO_2$, MgO, $SiO_2$, MCM-41, and $Al_2O_3$ can be used as the reforming bed.

Figure 14A:
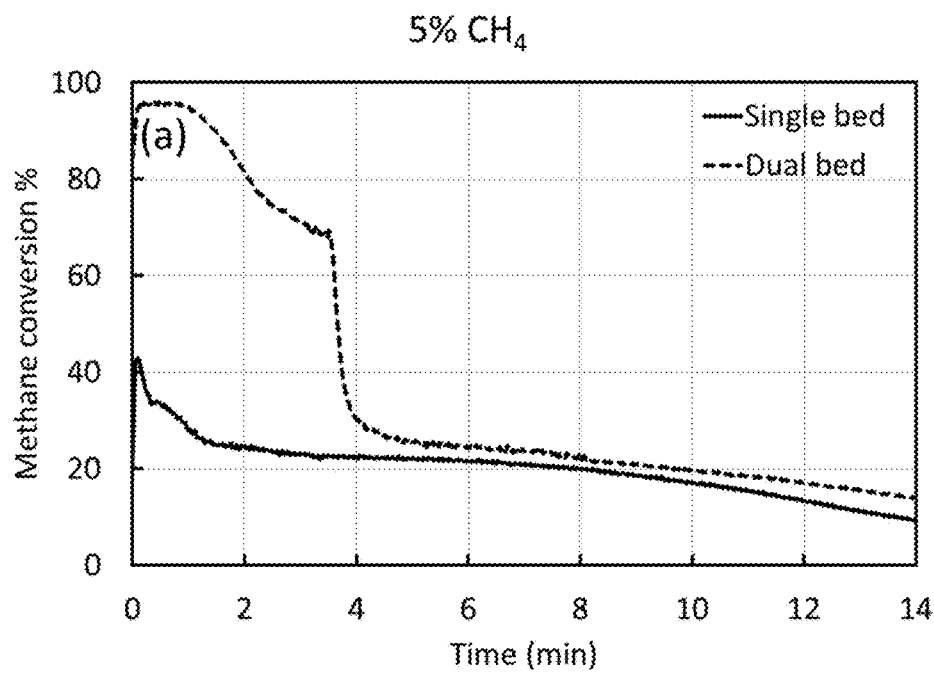
FIGS. 14A-14C are graphs of the instantaneous methane conversion on single vs dual bed experiment for 5% $CH_4$ (FIG. 14A), 10% $CH_4$ (FIG. 14B), and 20% $CH_4$ (FIG. 14C).
Figure 14B:
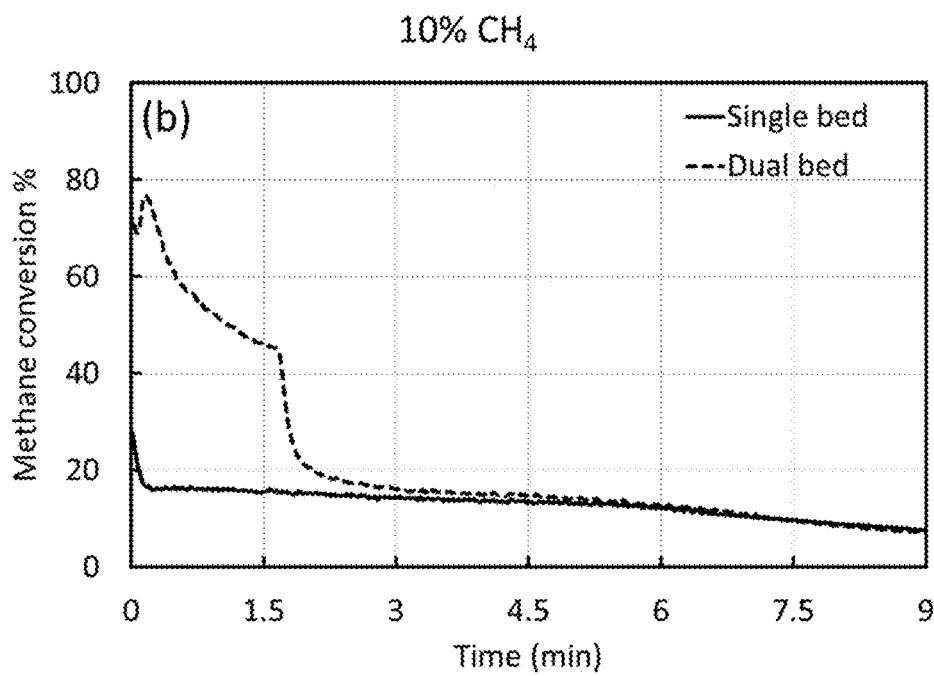
Figure 14C:
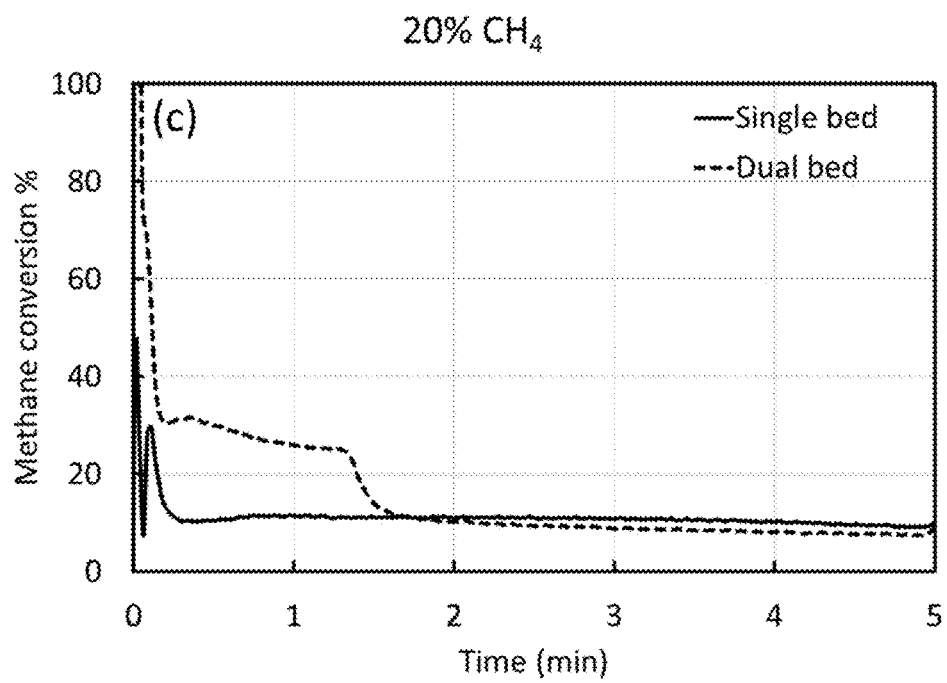

Preliminary results confirmed that a secondary reforming bed ($Al_2O_3$ with 0.4 wt. % Rh) can significantly enhance the methane conversion and syngas selectivity of a Rh-promoted $CaMnO_3$ (0.5 wt. %). Table 1 summarizes the CO and $H_2$ selectivity, methane conversion, and coke formation on a single and dual fixed-bed after 10 redox cycles at different conditions after. Comparison of the instantaneous methane conversions are also presented in FIGS. 14A-14C.

TABLE 1

Comparison of CO and $H_2$ selectivity, methane conversion, and coke formation during the 10th methane-oxygen redox cycle on the Rh-promoted $CaMnO_3$ bed and Rh-promoted $CaMnO_3$ + Rh-promoted $Al_2O_3$ dual bed. (460 mg redox catalyst loading)

| Methane concentration % | Condition | reaction time (min) | CO selectivity % | $H_2$ selectivity % | Methane converted (ml) | Coke formation wt. % |
|---|---|---|---|---|---|---|
| 5% | single bed | 15 | 89.78 | 66.06 | 12.56 | 0.01 |
|    | dual bed   |    | 94.65 | 83.21 | 19.79 | 0.02 |
| 10% | single bed | 10 | 92.62 | 32.42 | 11.49 | 0.01 |
|     | dual bed   |    | 96.43 | 90.39 | 16.29 | 0.03 |
| 20% | single bed | 5  | 93.46 | 80.25 | 9.81  | 0.01 |
|     | dual bed   |    | 99.92 | 88.38 | 12.03 | 0.01 |

The reforming catalyst bed can be implemented in a separate reactor in the downstream. A separate reactor can prevent the oxidation of the reforming bed and can be operated at a different temperature (typically higher) to maximize the syngas yield. It can also be integrated with the embodiment 1 configuration.

Figure 15A:
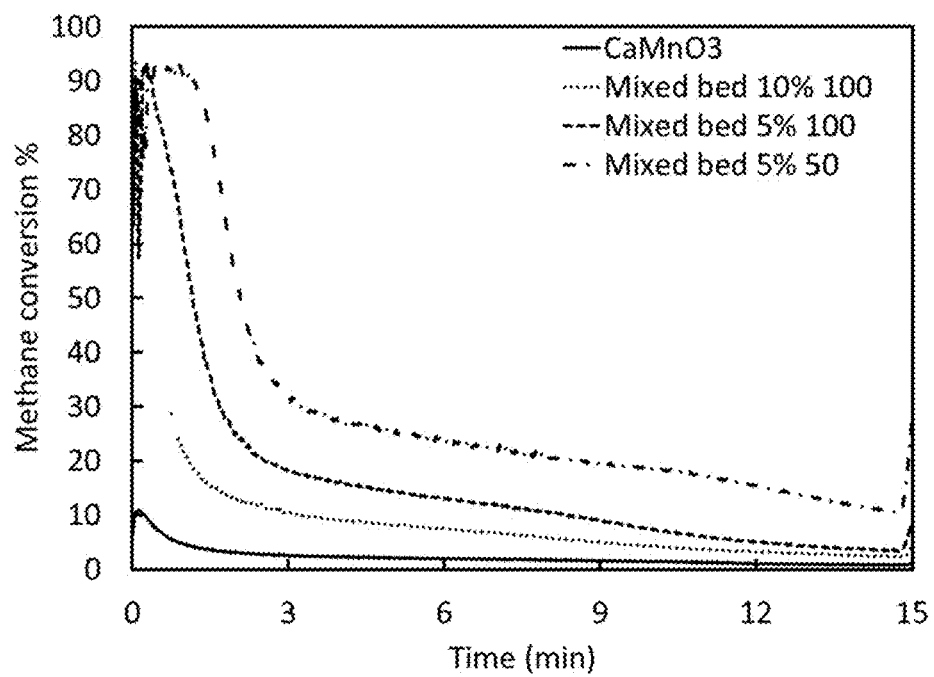
FIG. 15A is a graph of the instantaneous methane conversion on Rh-promoted $CaMnO_3$ vs mixed Rh-promoted $CaMnO_3$ and Rh-promoted $Al_2O_3$ during a 15-min reduction/oxidation half cycles.
Figure 15B:
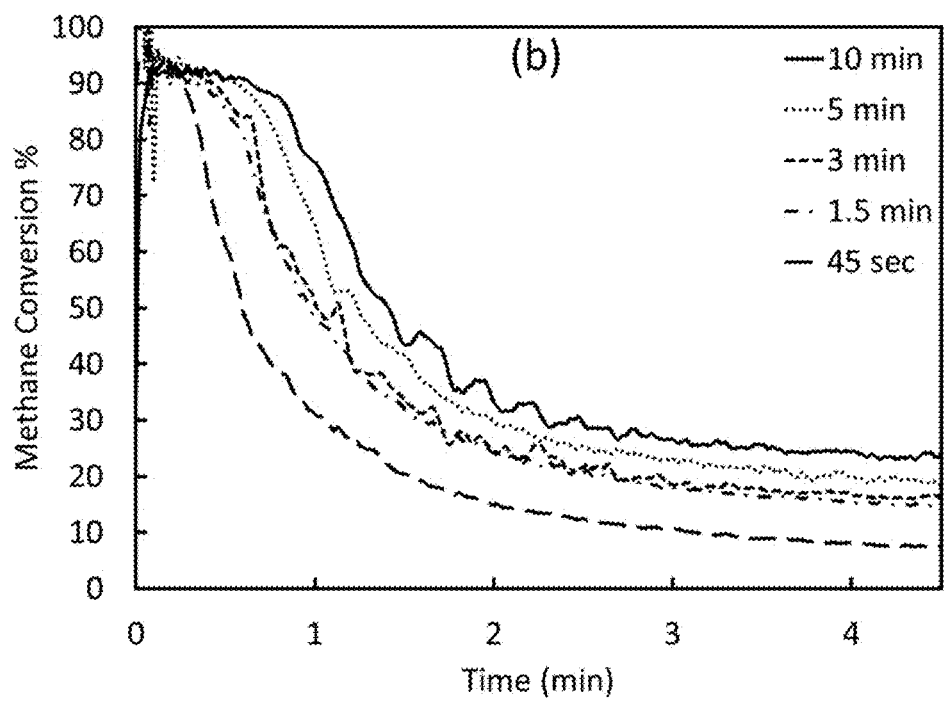
FIG. 15B is a graph of the instantaneous methane conversion on a mixed Rh-promoted $CaMnO_3$ and Rh-promoted $Al_2O_3$ bed during a 5-min half cycle following different oxidation periods.

The reforming catalyst can also be mixed with the redox catalyst to form a mixed redox bed with improved syngas selectivity and methane conversion. The syngas selectivity and methane conversion then can be modified by tuning the methane concentration during the reduction half cycle or the oxidation half cycle time. Table 2 summarizes the CO and $H_2$ selectivity, and methane conversion on a Rh-promoted $CaMnO_3$ before and after addition of the reforming catalyst (0.4 wt. % Rh promoted $Al_2O_3$) at different space velocities and methane concentrations, and Table 3 compares the performance of the mixed bed in different oxidation periods within a 5-minute reduction half cycle. Comparison of the instantaneous methane conversions are also presented in FIGS. 15A-15B.

TABLE 2

Comparison of CO and $H_2$ selectivity, methane conversion, and the amount of oxygen extraction on a Rh-promoted $CaMnO_3$ and a mixed Rh-promoted $CaMnO_3$ and Rh-promoted $Al_2O_3$ during a 15-min methane reduction/oxidation half cycle (230 mg redox catalyst loading)

| Catalyst bed | Total flow rate (ml/min) | $CH_4$ concentration (vol. %) | CO selectivity % | $H_2$ selectivity % | Methane converted (ml) | $O_2$ extracted wt. % |
|---|---|---|---|---|---|---|
| $CaMnO_3$ | 100 | 10 | 75.19 | 85.83 | 2.53 | 5.54 |
| Mixed     | 100 | 10 | 90.81 | 107.63 | 11.05 | 14.83 |
| $CaMnO_3$ | 100 | 5  | 87.63 | 92.59 | 8.73 | 15.87 |
| and $Al_2O_3$ | 50 | 5 | 88.92 | 76.90 | 13.87 | 31.17 |

TABLE 3

Comparison of CO and $H_2$ selectivity, methane conversion, and the amount of oxygen extraction on a mixed Rh-promoted $CaMnO_3$ and Rh-promoted $Al_2O_3$ during a 5-min methane reduction half cycle follwing different oxidation periods (230 mg redox catalyst loading)

| Oxidation (min) | CO selectivity % | H2 selectivity % | Methane converted (ml) | O2 extracted wt. % |
|---|---|---|---|---|
| 10   | 86.42 | 80.43 | 5.25 | 2.49 |
| 5    | 89.80 | 81.01 | 4.65 | 2.26 |
| 3    | 89.42 | 84.21 | 4.21 | 2.05 |
| 1.5  | 91.30 | 84.63 | 4.02 | 1.87 |
| 0.75 | 90.70 | 88.96 | 3.25 | 1.72 |

The effect of varying reduction and/or oxidation step times can be further illustrated in Tables 4-9 for $CaMnO_3$ based redox catalysts under the dual bed scheme. These results showed $CH_4$ conversion, CO selectivity, and $H_2$ selectivity can be modified by varying reduction and/or oxidation step times. These tables show that, in general, an increase in oxidation time resulted in an increase in $CH_4$ conversion a decrease in CO selectivity and/or $H_2$ selectivity. The extent of this effect varied, depending on redox catalyst. This tables also show that a decrease in reduction time results in an increase in $CH_4$ conversion.

Figure 16:
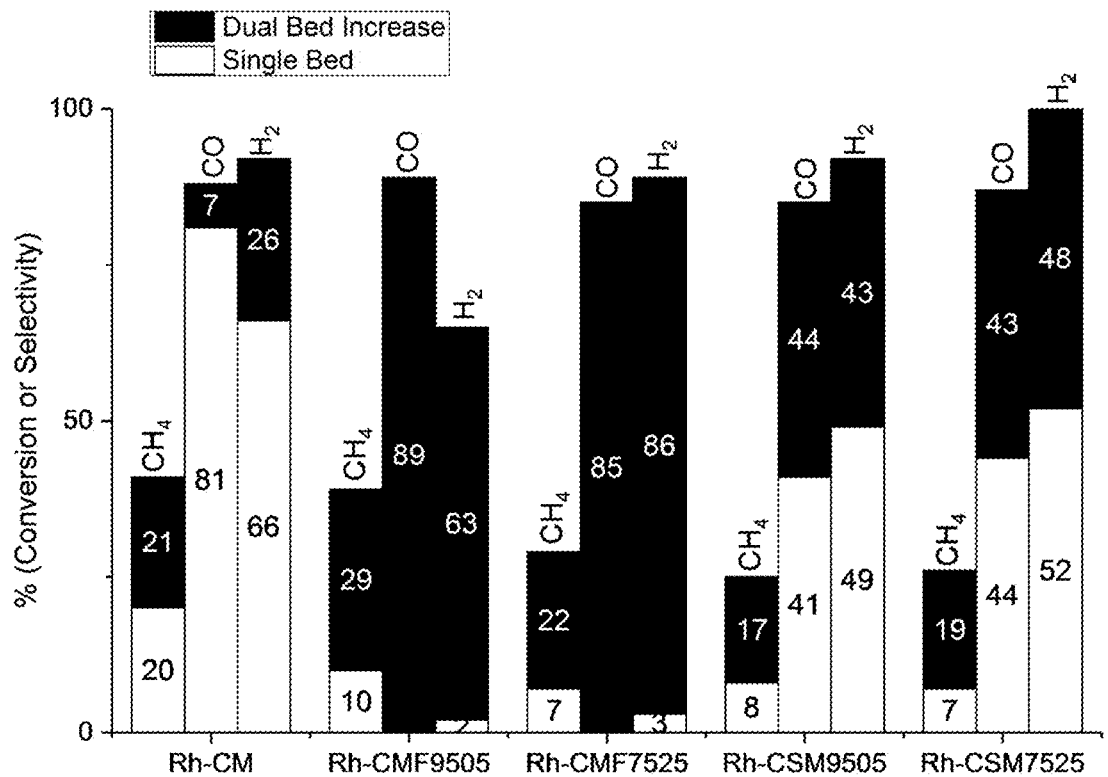
FIG. 16 is a graph of $CH_4$ conversion, CO selectivity, and Syngas Selectivity in both single and dual bed for Rh promoted $CaMnO_3$ (Rh-CM), Rh promoted $Ca Mn_{0.75}Fe_{0.25}O_3$(Rh-CMF7525), Rh promoted $Ca Mn_{0.95}Fe_{0.05}O_3$ (Rh-CMF9505), Rh promoted $Ca_{0.75}Sr_{0.25}MnO_3$ (Rh-CSM7525), Rh promoted $Ca_{0.95}Sr_{0.05}MnO_3$ (Rh-CSM9505) during a 15-min reduction and 10-min oxidation

Doping the perovskite redox catalysts with heteroatoms such as Sr in the A-site and/or Fe in the B-site can further modify the performance of the redox catalysts in single bed, composite bed or dual bed modes. FIG. 16 illustrates the effects of dopant addition in single bed and dual bed modes. Single bed results shows Sr doping results in selectivity to CO and $H_2$ close to 50%, showing there is a split between complete and partial combustion. Fe doping, in contrast, results in CO and $H_2$ selectivity close to 0%, meaning complete combustion is heavily favored. Both dopants lower $CH_4$ conversion, in the single bed scheme. Use of the dual bed scheme for both Sr and Fe doped $CaMnO_3$ redox catalysts resulted in high selectivity to CO and/or $H_2$ and $CH_4$ conversion over 25% with use of Rh promoted $CaMn_{0.95}Fe_{0.05}O_3$ resulting in 39% $CH_4$ conversion. Tables 6-9 illustrate the effects of varying the reduction and/or oxidation step times for two Fe doped $CaMnO_3$ redox catalyst in dual bed mode. These results show Fe doping provides a material that will reach a plateau of $CH_4$ conversion at 3 minutes of oxidation (Tables 6 and 8). Additionally, effect of oxidation time on selectivity is only slight, with only 5 minutes of oxidation using Rh promoted $CaMn_{0.95}Fe_{0.05}O_3$ showing a decrease in $H_2$ selectivity (Table 6). Tables 7 and 9 show in the effect of varying reduction time, showing that a shorter reduction results in higher CH$_4$ conversion, without a notable effect on selectivity. Close to 90% conversion of methane with 80+% syngas selectivity can be obtained at 600 C. Further increase in conversion and product selectivity can be anticipated with optimized reduction/oxidation durations and/or increase in operating temperatures. Operating temperature was 600 C for all the data shown in Table 4-9.

TABLE 4

Results for CH$_4$ conversion, CO selectivity, and H$_2$ selectivity with varying oxidation time and five minutes of reduction using Rh promoted CaMnO$_3$ in dual bed scheme

|  | 1 min | 1.5 min | 3 min | 5 min |
| --- | --- | --- | --- | --- |
| CH$_4$ Conversion | 22 | 28 | 31 | 37 |
| CO Selectivity | 95 | 85 | 85 | 85 |
| H$_2$ Selectivity | 95 | 100 | 99 | 76 |

TABLE 5

Results for CH$_4$ conversion, CO selectivity, and H$_2$ selectivity with varying reduction time and three minutes of oxidation using Rh promoted CaMnO$_3$ in dual bed scheme

|  | 3 min | 5 min | 7 min |
| --- | --- | --- | --- |
| CH$_4$ Conversion | 38 | 31 | 27 |
| CO Selectivity | 85 | 85 | 90 |
| H$_2$ Selectivity | 95 | 99 | 100 |

TABLE 6

Results for CH$_4$ conversion, CO selectivity, and H$_2$ selectivity with varying oxidation times and five minutes of reduction using Rh promoted CaMn$_{0.95}$Fe$_{0.05}$O$_3$ in dual bed scheme

|  | 1 min | 3 min | 5 min |
| --- | --- | --- | --- |
| CH$_4$ Conversion | 27 | 46 | 51 |
| CO Selectivity | 90 | 82 | 84 |
| H$_2$ Selectivity | 97 | 100 | 100 |

TABLE 7

Results for CH$_4$ conversion, CO selectivity, and H$_2$ selectivity with varying reduction times and five minutes of oxidation using Rh promoted CaMn$_{0.95}$Fe$_{0.05}$O$_3$ in dual bed scheme

|  | 3 min | 5 min | 7 min |
| --- | --- | --- | --- |
| CH$_4$ Conversion | 48 | 51 | 34 |
| CO Selectivity | 91 | 84 | 92 |
| H$_2$ Selectivity | 84.3 | 100 | 46 |

TABLE 8

Results for CH$_4$ conversion, CO selectivity and H$_2$ selectivity using varying oxidation times and 5 minutes of reduction using Rh promoted CaMn$_{0.75}$Fe$_{0.25}$O$_3$ in dual bed scheme

|  | 1 min | 1.5 min | 3 min | 5 min |
| --- | --- | --- | --- | --- |
| CH$_4$ Conversion | 21 | 35 | 33 | 34 |
| CO Selectivity | 93 | 91 | 92 | 89 |
| H$_2$ Selectivity | 100 | 97 | 100 | 100 |

TABLE 9

Results for CH$_4$ conversion, CO selectivity, and H$_2$ selectivity using varying reduction times and 5 minutes of oxidation using Rh promoted CaMn$_{0.75}$Fe$_{0.25}$O$_3$, including results using half residence time at 3 minutes of reduction, labeled 1/2τ, in dual bed scheme

|  | 3 min | 5 min | 7 min | 3 min (1/2 τ) |
| --- | --- | --- | --- | --- |
| CH$_4$ Conversion | 42 | 34 | 31 | 87 |
| CO Selectivity | 87 | 89 | 90 | 78 |
| H$_2$ Selectivity | 100 | 100 | 100 | 83 |

FIG. 16 further illustrates the effect of dopants and the secondary reforming catalyst bed. Significantly improved methane conversion can be seen with the secondary reforming catalyst bed.

While most of the data shown are obtained at 600 C, methane conversion can be further increased by a significant extent, when operating at higher reactor temperature, operating with lower gas hourly space velocity, or operated with redox catalysts with increased surface area, increased levels of platinum group metal contents. Sample platinum group metals include Rh, Ru, Pt, Pd or combination thereof. Other metals that can be used to promote the activity of the redox catalyst either alone or together with the platinum group metals include Re, Au, Co, Ni, W, Ag or combination.

Figure 17:
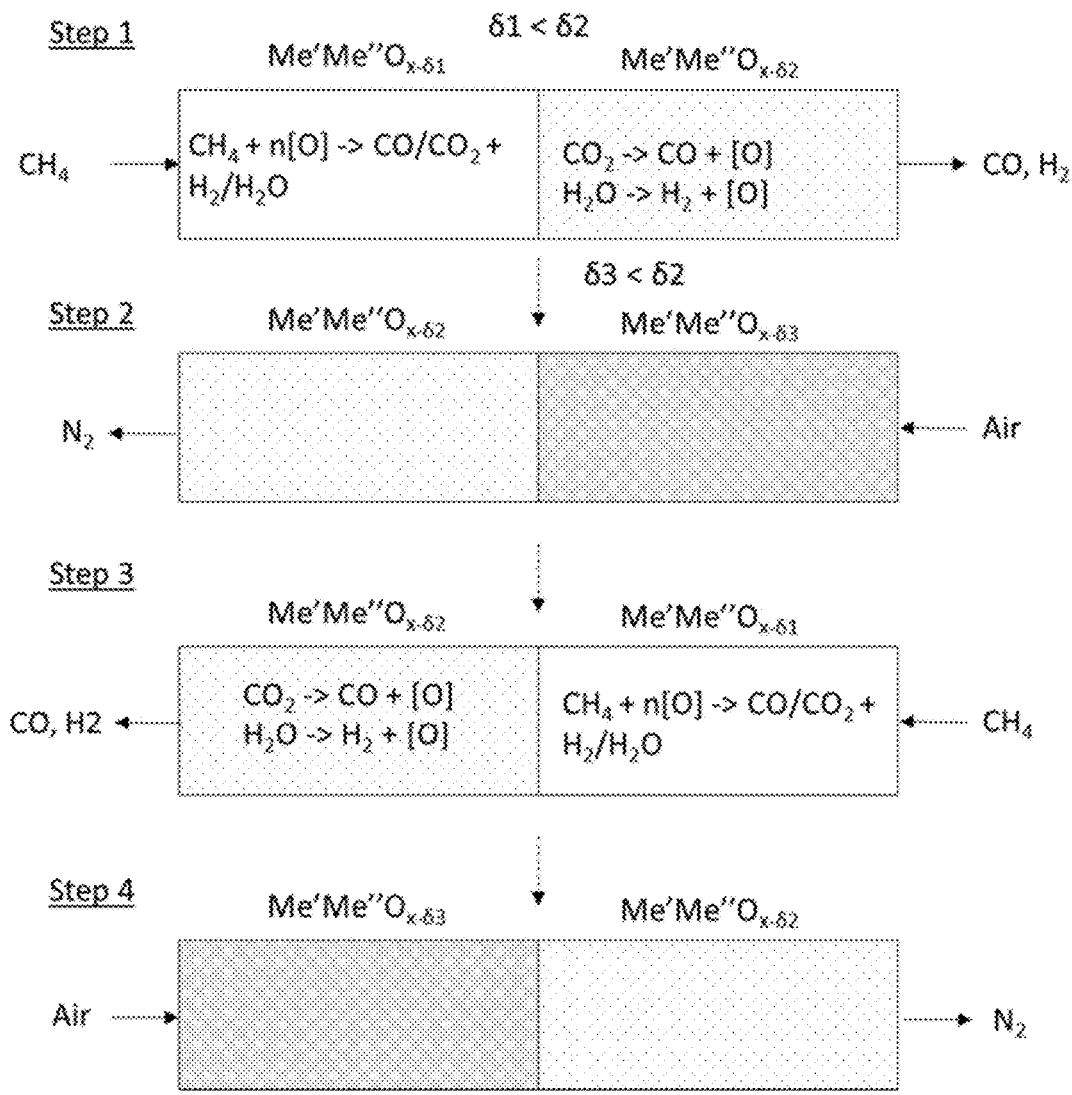
FIG. 17 is a schematic showing the four step process of a reverse flow reactor using a mixed metal oxide Me'Me''$O_{x-\delta}$.
Figure 18:
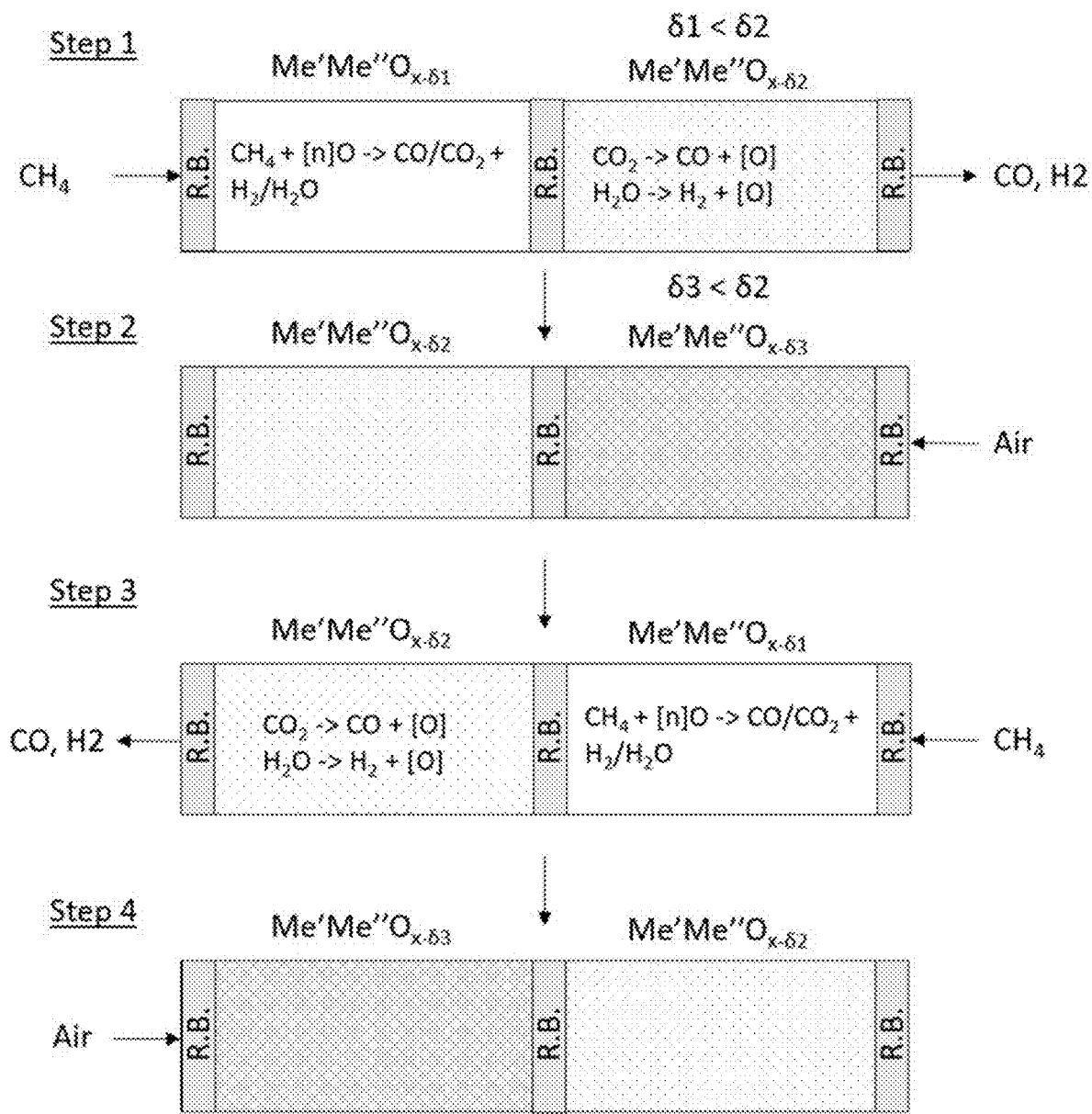
FIG. 18 is a schematic showing the four step process of a reverse flow reactor using a mixed metal oxide Me'Me''$O_{x-\delta}$ with three optional reforming beds (R.B.).

A challenge for methane partial oxidation or reforming at low temperature is equilibrium limitations. Taking methane partial oxidation (with O$_2$) as an example, thermodynamics dictate that methane oxidation reaction at relatively low temperatures (e.g. 600° C.-700° C.) can result in either high methane conversion and low syngas selectivity or low conversion and high syngas selectivity from an equilibrium standpoint. That is, one cannot anticipate to achieve both high syngas selectivity and high methane conversion. Such equilibrium limitation is more severe when the system pressure is high. The redox catalyst system disclosed herein can address this limitations, as illustrated in FIGS. 17 and 18. FIG. 17 depicts an embodiment of fixed bed operation with a generic metal oxide that is capable of: i. methane oxidation including methane over-oxidation (to CO$_2$ and H$_2$O) when in relatively oxidized forms (denoted as Me'Me"O$_{x-\delta 1}$); ii. water and CO$_2$-splitting when relatively reduced forms (denoted as Me'Me"O$_{x-\delta 2}$). With a fixed bed of the redox catalyst material with one end containing relatively oxidized redox catalyst and the other end enriched with relatively reduced redox catalyst, one can anticipate (over) oxidation of methane to a mixture of CO, CO$_2$, H$_2$, and H$_2$O via the reaction below where [O] denotes lattice oxygen in Me'Me"O$_{x-\delta 1}$.

$$CH_4 + n[O] \rightarrow CO/CO_2 + H_2/H_2O$$

As such, the left end of the bed in Step 1 serves the function of ensuring high methane conversion. Meanwhile, the redox catalyst can be reduced to its relatively reduced form (Me'Me"O$_{x-\delta 2}$) at the end of the Step 1.

The right end of the bed, initially composed of relatively reduced redox catalysts, serves the function of splitting the over-oxidized H$_2$O and CO$_2$ in the left end of the bed. Meanwhile, the relatively reduced redox catalyst in the right end of the bed gets somewhat oxidized (denoted as Me'Me"O$_{x-\delta 3}$) by the end of Step 1.

$$CO_2/H_2O \rightarrow CO/H_2 + [O]$$

Overall, the left end of the bed ensures high methane conversion whereas the right end of the bed therefore ensures high syngas selectivity. While the high concentration of syngas can be thermodynamically favored to be partially converted back to methane, redox catalyst is intentionally designed with low activity for methanation reaction to inhibit this undesirable reaction. As such, the system circumvents the equilibrium limitations.

Step 2 serves the purpose of oxidizing the somewhat oxidized redox catalyst (Me'Me"$O_{x-\delta 3}$) to relatively oxidized redox catalyst (Me'Me"$O_{x-\delta 1}$). This is achieved by introducing oxygen containing gas, e.g. air, to the right side of the fixed bed reactor. The amount of oxygen introduced is controlled such that only the right side of the redox catalyst is oxidized and the left side of the redox catalyst is maintained at relatively reduced form (Me'Me"$O_{x-\delta 2}$). This is feasible since the redox catalyst is highly active when reacting with $O_2$. Upon completion of Step 2, the packed bed is prepared for the next methane oxidation step (Step 3). Step 3 is identical to Step 1 except for opposite location of the relatively reduced and relatively oxidized redox catalysts. Therefore, the methane flow direction is also reversed.

Similarly, Step 4 mirrors Step 2 but the oxygen containing gas is injected in the opposite direction than Step 2. Upon completion of Step 4, the bed is returned to its original form and is ready for another round of Step 1-4 operations.

While the figure donates a single packed bed reactor tube, many reactor tubes can be bundled together for heat integration and continuous production of syngas. While packed bed is shown in this case, simulated moving bed, moving bed, rotating bed, or other types of reactor configurations can be used to achieve the function of circumventing thermodynamic equilibrium following a similar type of approach described above. It is also noted that FIG. 17 divide the bed into two sections and illustrate the redox catalysts in each section of the bed as having identical oxidation states for illustration purpose. In reality, the redox catalysts' metal cations' average oxidation state can gradually vary across the bed. Optionally, reforming catalyst beds (or mixtures of reforming catalysts with the redox catalysts) can be used as illustrate in FIG. 18.

Redox catalysts that can be suitable for this example include ceria containing oxides, La, Ba, Sr, and/or Ca containing perovskite oxides or perovskite related oxides. These perovskite related oxides should also contain one or more of the following metal cations including but not limit to Fe, Ni, Mn, Al, Ti, Cu. Specific examples include BaMn$_x$Fe$_{1-x}$O$_{3-\delta}$, La$_x$Sr$_{1-x}$Fe$_y$Co$_{1-y}$O$_{3-\delta}$, La$_x$Ca$_{1-x}$Fe$_y$Co$_{1-y}$O$_{3-\delta}$, La$_x$Sr$_{1-x}$Fe$_y$A$_{1-y}$O$_{3-\delta}$, SrFeO$_3$, Sr$_{n+1}$Fe$_n$O$_{3n+1}$.

Doped CaMnO$_3$-based redox catalysts (described above) with small amounts of platinum group metal promoters can be used in three way catalysts (TWC) with enhanced oxygen carrying capacity used in automotive catalytic convertors.

Addition of a secondary perovskite phase such as those used in fuel cells to the materials described above can be used to improve the surface exchange. The secondary phase can be La$_{1-x}$Sr$_x$BO$_{3-\delta}$-based materials with B being Fe, Mn, Co or combination thereof.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

To exemplify the superior performance of the promoted mixed oxides, two base mixed oxide redox catalysts are synthesized, i.e. CaMnO$_3$ and LaCeO$_3$. CaMnO$_3$ has "oxygen uncoupling" properties and spontaneously releases oxygen at elevated temperatures due to its high equilibrium $P_{O2}$. LaCeO$_{3.5}$, on the other hand, has low equilibrium $P_{O2}$ which is desirable for POx reactions from a syngas selectivity standpoint. The details of the redox catalyst preparation and testing along with the significant results are presented in this section.

Redox Catalyst Synthesis

Two redox catalysts were synthesized for this study: CaMnO$_3$ and LaCeO$_{3.5}$. The samples were prepared using a modified Pechini method. Details of the method is described elsewhere. In short, stoichiometric amounts of nitrate salts of lanthanum and cerium, or calcium and manganese were dissolved in deionized water and stirred for 30 minutes at room temperature to form a homogeneous solution. Citric acid is added to the solution with the molar ratio of 2.5:1 of citric acid and total cations and the solution is kept under stirring for another half an hour at 60° C. Ethylene glycol with the molar ratio of 1.5:1 with respect to citric acid was then added to the solution, and temperature of the solution is increased to 80° C. under stirring until a homogeneous gel is formed. The gel is then dried overnight at 100° C. and annealed at 950° C. for 8 hours.

The surface of the synthesized redox catalysts was also promoted with rhodium using an incipient wetness method (0.5 wt. % Rh). Rhodium nitrate salt was dissolve in deionized water and proper amounts of the solution were added to the samples in multiple steps. The impregnated samples were then dried at 100° C. for 4 hours and fired at 950° C. for 6 hours. We note that although the cost of Rh can be prohibitive for conventional, circulating fluid bed based CLR; the current study focuses on mechanistic investigations of the effects of surface promotion. Moreover, the high activity exhibited by the Rh-promoted redox catalysts at low temperatures offers the opportunities to use such redox catalysts in simplified fixed bed systems to minimize attritions and particle loss.

Sample Characterizations

Powder X-ray diffraction (XRD) experiments were performed. XRD patterns were obtained using a Rigaku SmartLab X-ray diffractometer with Cu—Kα ($\lambda$=0.1542) radiation operating at 40 kV and 44 mA. A stepwise approach with a step size of 0.1° and residence time of 2.5 seconds at each step in 20-80° angle range (2θ) was used to generate the XRD patterns. Similar experiments were also performed on the spent samples to confirm their phase stability. X-ray photoelectron spectroscopy (XPS, Thermo Fisher Scientific Inc) with an Al-Kα X-ray source at an operating voltage of 20 kV and a current of 10 mA is used to analyze near surface elemental compositions. Survey spectra and the single element spectra were collected with 20 eV and 100 eV pass energy. Diffuse reflectance infrared Fourier transform spectroscopy (DRIFTS) is also performed on the selected samples to distinguish their different surface activation and intermediate species. DRIFTS measurements are performed in an in-situ reaction cell (Pike Technologies DiffuseIR cell) that allowed continuous gas flow through the samples. The spectra are collected on a Thermo Scientific Nicolet iS50 FT-IR spectrometer equipped with MCT/A detector and KBr beam splitter and optics using 128 scans at 4 cm$^{-1}$ resolution. The CO desorption experiments were performed on the reduced samples (50% H$_2$ balance Ar, 700° C., 1 hour). The samples were exposed to CO (grade 5.0, 50% balance Ar) at room temperatures and spectra were collected after purging the system with argon.

Redox Experiments

Reducibility of the samples in methane was tested through temperature programed reduction (TPR) experiments. The experiments were performed in a thermal gravimetric analyzer (TGA, Q600 TA Instruments) and in 10 vol. % methane (grade 5.0, balance Ar). The temperature was increased from room temperature to 1000° C. with a 20° C./min ramping rate and kept isothermal for 30 minutes. The samples were oxidized at 900° C. in 20% oxygen (ultra dry, balance Ar) for 30 minutes prior to the experiments.

Redox experiments were performed in fixed bed configuration. Reactor effluent was analyzed using a quadrupole mass spectrometer.

Same reactor configuration was used to perform the pulse injection and cofeed ($CH_4$ and $O_2$) experiments. Detailed gas delivery configuration was presented elsewhere. The pulse injection configuration allows injection of small amounts of reactive gases on the catalyst to observe the behavior of the catalyst with minimal change in its bulk properties. This also allows conducting methane isotope exchange experiments by co-injection of methane and deuterated methane and monitoring the exchange products.

Results and Discussion

Redox Catalyst Selection and Characterization

Two redox catalysts are chosen as the examples: $CaMnO_3$ and $LaCeO_{3.5}$.

TABLE 10

Rietveld refinement analysis data for $CaMnO_3$ (Orthorhombic, Pbcm) after addition of 0.5 wt % Rh which corresponds to 0.7% Rh in the B-site of the perovskite structure

| Parameter | $CaMnO_3$ | $CaMnO_3$ + Rh |
|---|---|---|
| a (Å) | 5.281 | 5.281 |
| b (Å) | 7.455 | 7.456 |
| c (Å) | 5.267 | 5.272 |

Methane TPR Experiments

Figure 3:
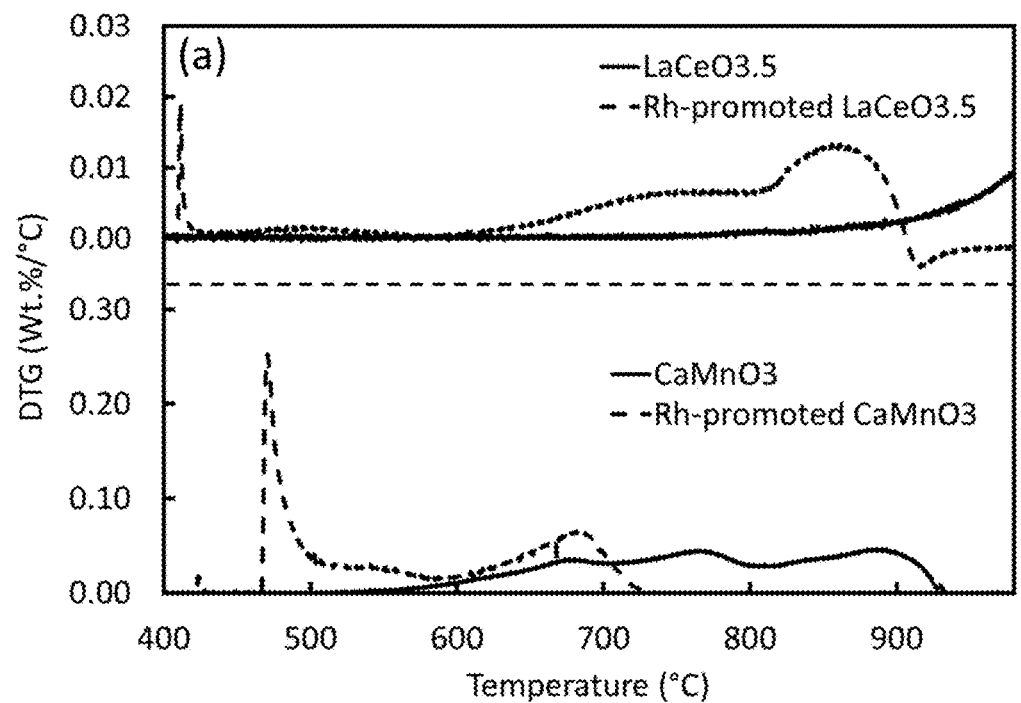
FIG. 3 is a graph of the DTG results of redox catalysts in methane TPR experiments (20° C./min ramping rate).

TPR experiments were performed to investigate the effect of Rh on the reactivity of the redox catalysts in methane. Differential thermal gravimetric (DTG) analysis was used to determine the reduction temperatures of the samples in methane. FIG. 3a compares the DTG data of the promoted and un-promoted redox catalysts (weight loss data in FIG. 3b). It is obvious that the presence of Rh changes their reduction properties. The initial reduction temperature of the $CaMnO_3$ was decreased by almost 200° C. when Rh presents. Similarly, the Rh promoted $LaCeO_{3.5}$ started to reduce at around 600° C. whereas the unpromoted sample did not show any significant reduction till 950° C. The larger weight loss at lower temperatures can be attributed to changes in surface and/or bulk properties of the redox catalyst. Rh is known to promote methane activation. Therefore, presence of Rh on the surface of the redox catalyst can significantly enhance methane activation, leading to more effective oxygen removal at lower temperatures. In addition to surface enhancement, Rh could also be incorporated into the perovskite bulk structure, this can alter the thermodynamic and/or ionic conduction properties of the redox catalyst. The peaks observed at lower temperatures (~420° C.) are attributed to the rhodium oxide reduction as they appear only on the promoted samples. It is also evident that the oxygen carrying capacities of $CaMnO_3$ based redox catalysts are significantly higher than their $LaCeO_{3.5}$ counterparts (FIG. 3b).

Methane-Oxygen Redox Testing

Figure 4:
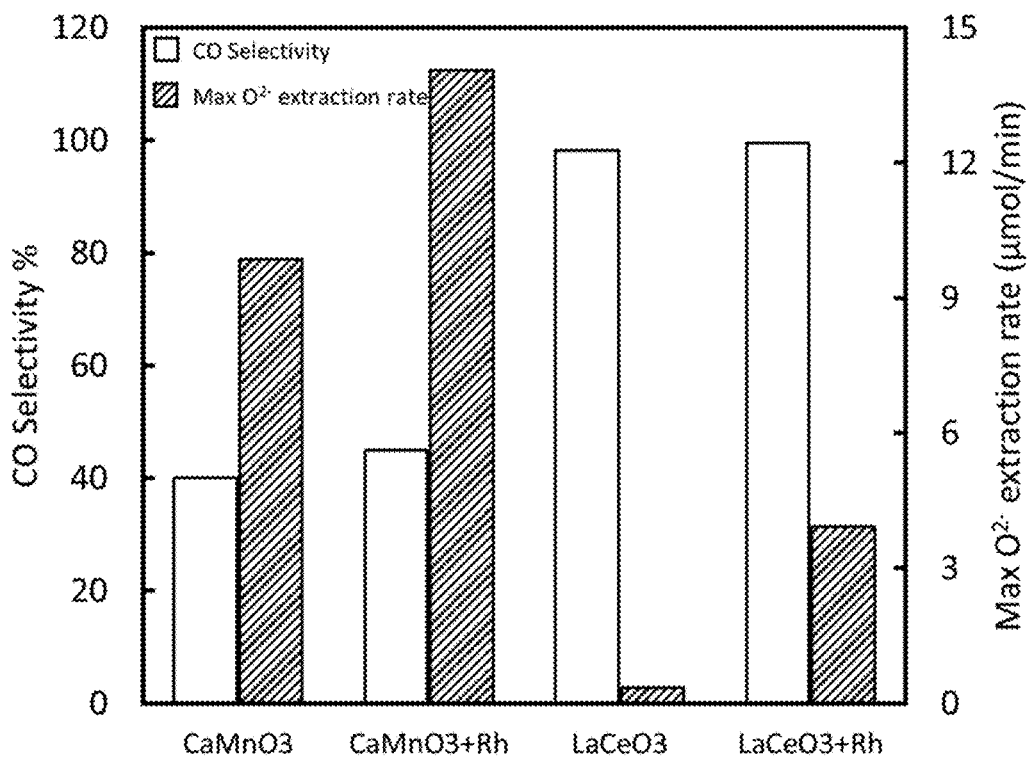
FIG. 4 is a graph comparing CO selectivity and maximum oxygen donation rate of the redox catalysts at 900° C.

The activity, selectivity, and coke resistance of the redox catalysts were tested in the U-tube reactor. Redox experiments were performed by alternating the reactor feed at 900° C. A relatively low gas residence time was used to ensure low (≤515%) methane/oxygen conversions, in order to approximate a differential bed operation. Coke formation was quantified by calculating the amount of CO and $CO_2$ produced during the oxidation half cycle. FIG. 4 compares the CO selectivity and oxygen donation rate of the samples during the reduction half cycle in the 5$^{th}$ redox cycle. The CO and $H_2$ selectivity, $CH_4$ conversion, and coke formation data for the same cycle are summarized in Table 11.

As anticipated, the two unpromoted mixed oxides behave substantially different. Calcium manganate shows a faster but less selective conversion of methane while lanthanum ceria is more selective but with a much lower conversion rate. Both samples showed a non-selective region at the beginning of the POx reaction. This non-selective region is considerably more prominent for $CaMnO_3$ sample and is typically attributed to surface and/or loosely bonded oxygen species. After the initial $CO_2$ peaks, both samples become selective towards methane POx.

Figure 5:
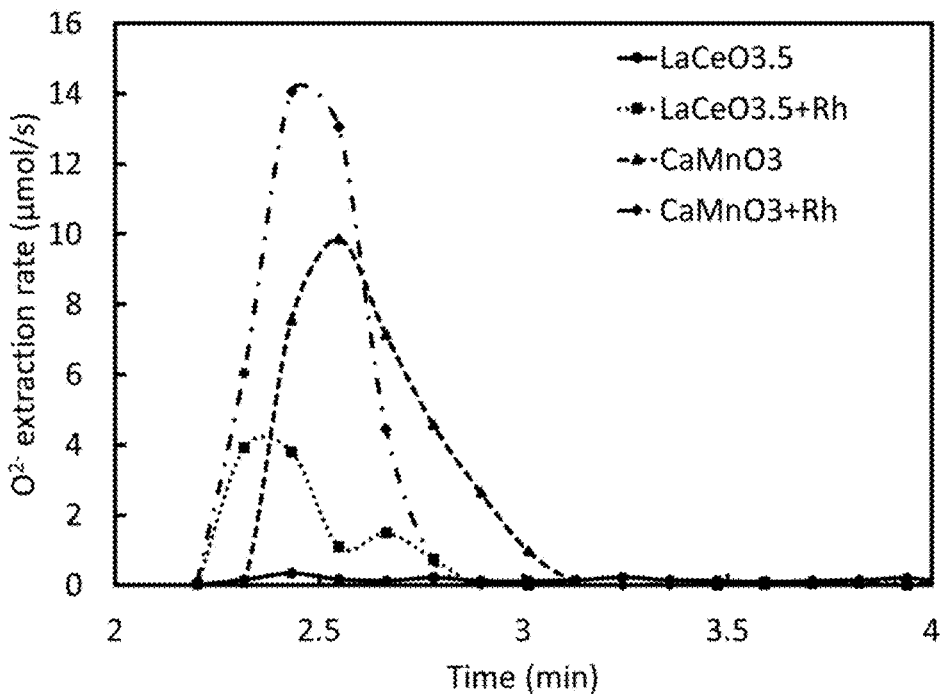
FIG. 5 is a graph of the oxygen extracted from the redox catalysts during the initial stages of the reduction at 900° C. in 10% methane.

The presence of Rh significantly affects both selectivity and methane conversion. Lanthanum ceria undergoes a substantial kinetic improvement when promoted with Rh. The presence of Rh increases maximum oxygen donation rate by more than 11 times. Slight increase in CO selectivity is also observed. The kinetic improvement is less significant for calcium manganate, which is already highly active at 900° C. without promoters. Nevertheless, 40% improvements in the rate of oxygen removal was observed (FIG. 5). Slight increase is observed in both CO and $H_2$ selectivities were also observed. This is attributed to presence of metallic rhodium on the surface as will be discussed later.

TABLE 11

Methane coversion, CO/$H_2$ selectivity, oxygen donation, and coke formation of the redox catalysts during the reduction half cycle at 900° C.

| Sample | CO selectivity % | $H_2$ selectivity % (excluding $H_2$ from coke) | $H_2$ selectivity % (including $H_2$ from coke) | $CH_4$ converted (ml) | $O_2$ Extracted (wt. %) | Coke formation (wt. %) |
|---|---|---|---|---|---|---|
| $CaMnO_3$ | 40.08 | 29.34 | 37.18 | 2.13 | 9.18 | 0.29 |
| $CaMnO_3$ + Rh | 44.93 | 40.30 | 46.47 | 2.59 | 10.17 | 0.32 |
| $LaCeO_{3.5}$ | 98.21 | 86.76 | 87.69 | 2.13 | 3.91 | 0.17 |
| $LaCeO_{3.5}$ + Rh | 99.46 | 90.11 | 91.26 | 2.54 | 4.36 | 0.36 |

Addition of Rh increases the amounts of methane conversion and oxygen donation by about 20 and 8% respectively for these oxides. This increase in oxygen donation cannot be from the rhodium oxide reduction as reduction of $Rh_2O_3$ to Rh would have accounted for no more than 0.02 wt. % oxygen, which is significantly lower than the observed oxygen capacity increase. One potential explanation is that Rh is incorporated into the bulk structures of the mixed oxides, thereby changing their thermodynamic properties. This is not likely due to the very similar crystal structures of the samples (Table 10). The other possible explanation is the kinetic effect as the presence of Rh on the surface can improve methane activation. Enhancements in surface reaction rates can in turn accelerates the rates of lattice oxygen removal and increase oxygen carrying capacity of the redox catalysts under the 15 min reduction half cycle.

To shed light on the role of Rh, XPS experiments were performed. Table 12 summarizes the near surface concentrations of the elements in both oxidized and reduced forms after five complete redox cycles at 900° C. Near surface concentration of Rh on $LaCeO_{3.5}$ and $CaMnO_3$ remained 3-5 times higher than the nominal amount of Rh added. This confirms rhodium is enriched on the surface. Hence, improving the surface methane activation is likely to be the primary reason for the enhanced redox performance.

TABLE 12

Near surface atomic elemental composition of the redox catalysts in reduced and oxidized state after 5 methane/oxygen cycles based on XPS analysis

| Element | Average based on Rh-loading | Un-promoted-Ox | Rh-promoted Ox | Un-promoted Red | Rh-promoted Red |
|---|---|---|---|---|---|
| | | | $LaCeO_{3.5}$ | | |
| Ce | 18.13 | 5.27 | 5.62 | 3.49 | 4.26 |
| La | 18.13 | 12.65 | 11.58 | 14.16 | 12.26 |
| Rh | 0.30 | 0.00 | 1.52 | 0.00 | 1.18 |
| O | 63.45 | 82.08 | 81.28 | 82.35 | 82.31 |
| | | | $CaMnO_3$ | | |
| Mn | 19.97 | 8.97 | 8.66 | 5.73 | 5.98 |
| Ca | 19.97 | 23.52 | 23.88 | 24.23 | 23.07 |
| Rh | 0.14 | 0.00 | 0.43 | 0.00 | 0.67 |
| O | 59.92 | 67.51 | 67.03 | 70.03 | 70.27 |

Methane Conversion in the Presence of Gaseous Oxygen

To determine the effect of Rh on surface methane activation, methane-oxygen cofeed experiments are conducted. Five oxygen to methane ratios were used ($O_2/CH_4$: 1.5, 1, 0.5, 0.2, and 0.1). As expected, the CO selectivity on the un-promoted $LaCeO_3$ increased from 9.5% to 44.7% with decreasing $O_2:CH_4$ ratio. In comparison, CO selectivity is 98.2% under the $O_2$-free redox mode. This indicates that surface/loosely bonded oxygen species are likely to be responsible for methane combustion. In addition, the redox reaction is likely to be limited by bulk lattice oxygen conduction as evidenced by significantly higher methane conversion in the presence of gaseous oxygen. The immediate shift in selectivity observed on the un-promoted samples under redox mode indicates that the formation of non-selective surface oxygen species is inhibited in absence of gaseous oxygen. Similar trends are observed with the $CaMnO_3$-based samples.

Figure 6:
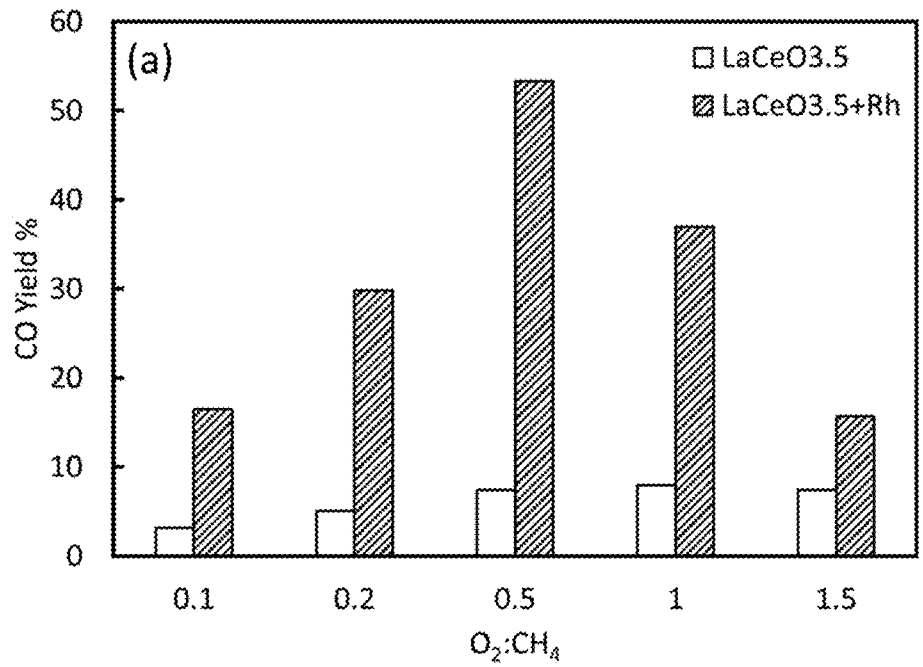
FIG. 6 is a bar graph comparing CO Yield during methane-oxygen cofeed experiments using un-promoted and Rh-promoted $LaCeO_{3.5}$-based redox catalyst.

Rh-promoted catalysts show notably different results. Methane conversion increases with oxygen concentrations and plateaus around 70% at $O_2:CH_4$ ratios above 1:1. Higher methane conversion is observed at low $O_2:CH_4$ ratios compared to the un-promoted sample. This indicates that presence of reduced Rh on the surface catalyzes methane activation. The promoted sample also showed improved CO selectivity, especially at lower $O_2:CH_4$ ratios (FIG. 6). These observations illustrate that presence of Rh on the surface substantially changes methane activation rate and mechanism. This is also corroborated by the methane isotope exchange studies below.

Methane Isotope Exchange

Isotope exchange experiments were performed to investigate methane activation on the promoted and un-promoted samples. An equimolar mixture of $CH_4$ and $CD_4$ (25% each, balance Ar) was injected to the redox catalysts at elevated temperatures. Ratios of $CHD_3$ (m/z=19) and $CD_4$ (m/z=20) signals are used to quantify the degree of methane activation on redox catalysts. These two mass/charge signals are chosen as they do not have partial contributions from the other exchange products. It is evident that the un-promoted and Rh-promoted samples behave significantly different. While the methane exchange remains relatively constant on the un-promoted samples during 10 pulse injections, it increased by up to 400% on the Rh-promoted samples, especially during the first 5 pulses. This indicates that reduced Rh significantly enhances methane activation and surface coverage of intermediate species from methane dissociation. The presence of metallic Rh on the surface is further confirmed by DRIFTS with CO temperature programmed desorption. The un-promoted and Rh-promoted $LaCeO_{3.5}$ samples showed markedly different IR-spectra for adsorbed CO species. The unpromoted sample only shows the formation of carbonate species (1300-1600 $cm^{-1}$) at room temperature. The Rh-promoted sample, in comparison, also forms carbonyl species (1980-2110 $cm^{-1}$). These carbonyl groups are stable until above 200° C. and gave rise to gaseous $CO_2$ species (2300-2400 $cm^{-1}$) at higher temperatures.

Transient Pulse Experiments

Pulse experiments were performed to investigate the effect of bulk oxygen conduction and surface evolution on the conversion and selectivity of the catalyst. Two different relaxation times of 30 seconds and 2 minutes were used between the 20 methane (50 vol. % balance Ar) pulses injected. The relaxation allows identification of potential $O^{2-}$ conduction limitations. The un-promoted $CaMnO_3$ sample demonstrates non-selective behavior regardless of the relaxation time. This indicates a faster $O^{2-}$ supply from the bulk when compared to the rate of oxygen removal from the surface. The Rh-promoted sample, however, shows a transition to selective partial oxidation after the first few pulses. This transition is consistent with the generation of reduced Rh on the surface.

Pulse injection on the $LaCeO_{3.5}$-based redox catalysts clearly shows that a higher relaxation time leads to a less selective behavior on the un-promoted sample. Significantly less oxygen extraction and methane conversion were also observed during the pulse injection on the un-promoted catalyst. This is consistent with the poor methane activation and slow overall kinetics of the $LaCeO_3$ redox catalyst combined with low methane concentration in pulse injection configuration. Further analysis of the pulses shows that at a similar oxygen content (after the $5^{th}$ pulse with 2 min relaxation and $10^{th}$ pulse with 30 sec relaxation), >250% more oxygen atoms are removed from $LaCeO_{3.5}$ in each pulse under a longer relaxation time, suggesting that $O^{2-}$ diffusion is rate limiting. Lower CO selectivity after longer relaxation suggests that the non-selective pathway is more dependent on type and concentration of oxygen species at the surface. Assuming that the injected methane pulse completely depletes the accessible surface oxygen species, the average rate of oxygen conduction to the surface is calculated to be $2.38\times10^{-2}$ and $1.52\times10^{-2}$ μmol/s during the first 30 seconds and two minutes respectively. These values are an order of magnitude lower than the initial rate of oxygen release from $LaCeO_{3.5}$ under a redox mode (0.343 μmol/s). This also explains the quick shift to selective pathway at the initial stage of the $LaCeO_{3.5}$ reduction in methane, i.e. non-selective surface oxygen species are consumed quickly due to the slow $O^{2-}$ replenishment from the bulk.

The presence of Rh significantly enhances the performance of the redox catalyst. Not only does it increase the methane conversion, it also keeps the catalyst selective after the first pulse. Based on isotope exchange results, Rh on the surface for both redox catalysts increase the number of activated methane reaction intermediates. Such reaction intermediates are likely to be highly effective for oxygen removal from the surface. The oxygen-depleted surface in turn enhances $O^{2-}$ conduction from the bulk. As a result, Rh promoted redox catalysts enter the selective region much faster than unpromoted redox catalysts.

Effect of Reaction Temperature on Redox Properties

Figure 7A:
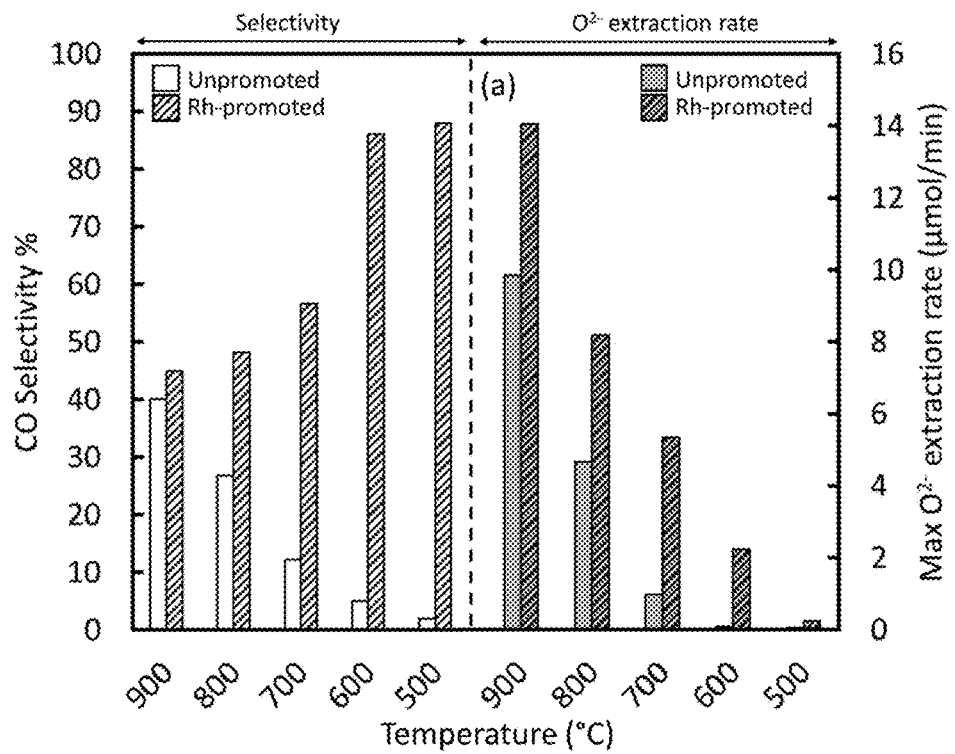
FIGS. 7A-7B are graphs of CO selectivity and maximum oxygen donation rate of the $CaMnO_3$-based (FIG. 7A) and $LaCeO_{3.5}$-based (FIG. 7B) redox catalysts at different temperatures.
Figure 7B:
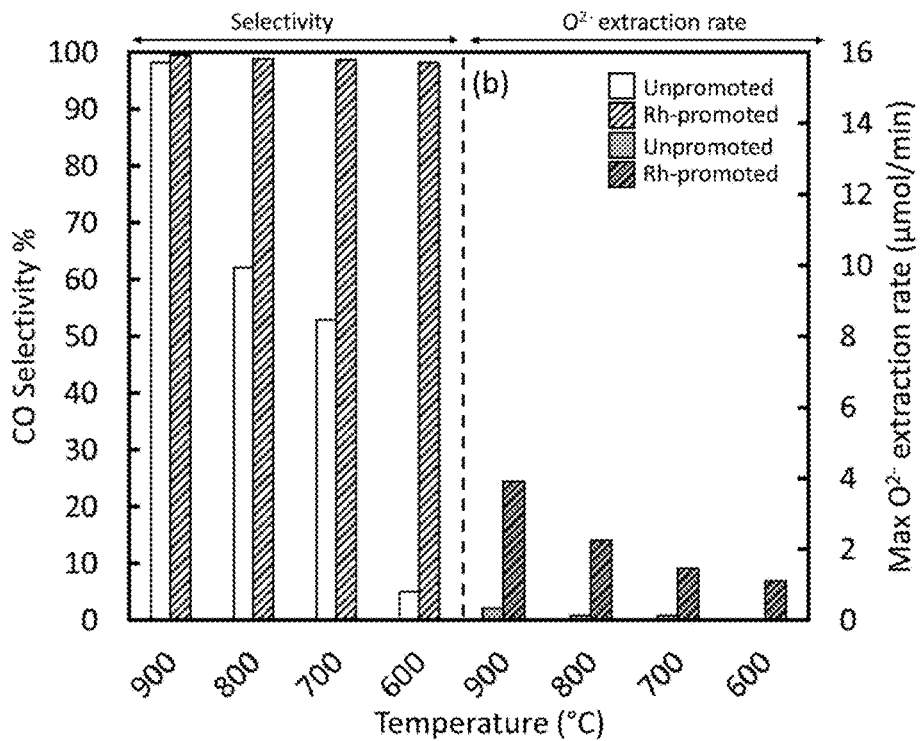

To further illustrate the effect of Rh, redox experiments were performed at lower temperatures (FIG. 7). $CaMnO_3$ redox catalyst exhibits lower activity for methane conversion at lower temperatures. A significant drop in CO selectivity is also observed (Table 13). $CaMnO_3$ appears to activate methane for deep oxidation until the surface and loosely bonded oxygen is depleted. After that, the redox catalyst doesn't show any activity. This implies that the surface of the catalyst cannot be replenished with bulk lattice oxygen either because of the $O^{2-}$ diffusivity at these temperatures, or smaller driving force for $O^{2-}$ conduction.

Redox experiments on the Rh-promoted samples showed more significant effects at lower temperatures (FIG. 7). Unlike the un-promoted $CaMnO_3$, CO selectivity of the promoted samples meaningfully increases with decreasing temperature. Decreasing the temperature suppresses the initial $CO_2$ formation and elongate the selective region. While un-promoted $CaMnO_3$ sample did not show noticeable activity at temperatures lower than 700° C., Rh-promoted sample exhibit high methane conversion and selectivity at 600° C. The redox catalyst remains to be active and selective at 500° C. At lower than 500° C., slow kinetics hindered the reaction and reduced methane conversion. The lower reaction temperature and less reduced surface lead to less coke formation. Above result shows that at 700° C. and lower, Rh or other platinum group metals can significantly increase the oxygen release of the $CaMnO_3$.

Similar trend is observed on the $LaCeO_{3.5}$-based samples with more significant kinetic improvement. While the un-promoted samples show very little activity at 800° C. and below, the promoted samples remained active down to 600° C. with initial oxygen release rate higher than that of the un-promoted sample at 900° C. This, again, confirms that providing methane activation sites on the surface allows for more oxygen extraction from the redox catalysts even at lower temperatures. Activation of the C—H bond enhances oxygen removal from the oxide surface.

TABLE 13

Methane coversion, CO/H₂ selectivity, oxygen donation, and coke formation of the CaMnO₃-based redox catalysts during the reduction half cycle

| | Temperature | CO selectivity % | H₂ selectivity % (excluding coke) | H₂ selectivity % (including coke) | CH₄ converted (ml) | O₂ Extracted (wt. %) | Coke formation (wt. %) |
|---|---|---|---|---|---|---|---|
| Un-promoted | 900 | 40.08 | 29.34 | 37.18 | 2.13 | 9.18 | 0.29 |
| | 800 | 26.85 | 15.71 | 20.73 | 1.80 | 8.79 | 0.12 |
| | 700 | 12.28 | 10.94 | 13.24 | 0.80 | 4.14 | 0.02 |
| Rh-promoted | 900 | 44.93 | 40.30 | 46.47 | 2.59 | 10.17 | 0.32 |
| | 800 | 48.23 | 58.49 | 62.54 | 2.57 | 8.62 | 0.30 |
| | 700 | 56.63 | 74.70 | 76.64 | 2.86 | 7.93 | 0.25 |
| | 600 | 86.10 | 97.14 | 97.17 | 3.68 | 6.29 | 0.04 |
| | 500 | 87.90 | 100.00 | 100.00 | 1.39 | 2.02 | 0.00 |

TABLE 14

Methane coversion, CO/H₂ selectivity, oxygen donation, and coke formation of the LaCeO₃.₅-based redox catalysts during the reduction half cycle (The selectivites of un-promoted sample at 800 and 700° C. are not very accurate due to low signal to noise ratio)

| | Temperature | CO selectivity % | H₂ selectivity % (excluding coke) | H₂ selectivity % (including coke) | CH₄ converted (ml) | O₂ Extracted (wt. %) | Coke formation (wt. %) |
|---|---|---|---|---|---|---|---|
| Un-promoted | 900 | 98.21 | 86.76 | 87.69 | 2.13 | 3.91 | 0.17 |
| | 800 | 62.10 | 59.16 | 63.66 | 0.32 | 0.99 | 0.02 |
| | 700 | 52.93 | 36.50 | 44.43 | 0.31 | 1.2 | 0.03 |
| Rh-promoted | 900 | 99.46 | 90.11 | 91.26 | 2.54 | 4.36 | 0.36 |
| | 800 | 99.60 | 100.00 | 100.00 | 2.10 | 2.60 | 0.21 |
| | 700 | 99.34 | 100.00 | 100.00 | 1.85 | 1.94 | 0.19 |

In order to differentiate the bulk and surface effects of rhodium on the redox performance of the catalysts, apparent activation energies of the lattice oxygen removal reaction and methane activation reaction are calculated for both continuous redox and pulse experiments. To do so, pulse experiments are conducted on $CaMnO_3$-based redox catalysts at 700, 800, and 900° C. (Table 15). While removal of surface oxygen is dominant in the transient pulse experiments, the continuous redox reactions can be affected by both bulk thermodynamics and surface properties of the catalyst. Comparing the effects of Rh on activation energies in these two reaction modes enables us to infer the primary role of rhodium. By fitting the maximum oxygen donation or methane conversion rate of the redox catalysts with Arrhenius equation, the apparent activation energies for redox experiments are obtained. In the pulse injection experiments, the reaction rates are quantified by the total oxygen removal or methane conversion during the first pulse. These activation energies are summarized in Table 16.

TABLE 15

Total methane converted and oxygen atoms removed from the $CaMnO_3$-based redox catalyst in the first methane pulse injection at various temperatures

| Redox catalyst | Temperature (° C.) | Maximum $O^{2-}$ removal rate (μmol) | Maximum methane conversion rate (μmol) |
|---|---|---|---|
| Rh-promoted | 900 | 47.58 | 24.62 |
| | 800 | 15.73 | 8.05 |
| | 700 | 4.14 | 2.37 |
| Unpromoted | 900 | 80.28 | 40.20 |
| | 800 | 80.50 | 40.69 |
| | 700 | 76.41 | 38.46 |

TABLE 16

Activation energies of the $CaMnO_3$-based catalysts in both redox and pulse injection configurations

| | Activation energy (kJ/mol) | | | |
|---|---|---|---|---|
| | Redox (bulk + surface) | | Pulse (surface) | |
| Sample | $O^{2-}$ | $CH_4$ | $O^{2-}$ | $CH_4$ |
| Un-promoted | 110.3 | 108.9 | 115.9 | 110.9 |
| Rh-promoted | 72.9 | 53.9 | 4.5 | 4.9 |

Table 16 clearly indicates that Rh has a more pronounced effect on the apparent activation energies in pulse experiments. While the apparent activation energy is reduced by about 33-50% in redox experiments, apparent activation energies derived from pulse experiments are decreased by more than 95%. This strongly indicates that Rh addition significantly increases the activity for surface oxygen removal, by way of enhanced C—H bond activation. The increase in overall redox activity of the metal oxides is likely to be resulted from the enhanced surface oxygen removal. This indicates that higher oxygen extraction rate is a direct result of a larger driving force for lattice oxygen removal, i.e. higher oxygen chemical potential gradient between the bulk and the surface of the redox catalyst.

Redox Catalyst Regeneration

CLR processes commonly uses air as the gaseous oxidant in the regeneration step. Other than availability and cost benefits of using air, the exothermic oxidation reaction between the oxygen deprived redox catalyst and $O_2$ generates enough energy to almost meet the energy requirement of the whole process. The heat generated during the regeneration step is stored in the oxidized redox catalyst and is transferred to the reducer. This significantly enhances the process economics by minimizing energy requirement of the process. Alternatively, the regeneration step can be performed in the presence of steam or $CO_2$ as the gaseous oxidant. Using these alternate oxidant, however, makes the regeneration step endothermic. Therefore, external energy sources are needed. Furthermore, stream generation imposes additional operating costs. These additional costs, however, can be offset by the added value of the side products. Using steam and carbon dioxide as oxidants results in formation of hydrogen and CO respectively which can be added to the produced syngas to achieve higher overall efficiency and a desirable $CO:H_2$ ratio. By integrating thermal energy into chemical energy ($H_2$ and syngas), the exergy loss from the process is significantly reduced. Lower $O_2$ partial pressure, provided by using $CO_2$ or steam, results in partial regeneration of the redox catalyst which can potentially further enhance the syngas selectivity as most of the unselective behavior of the redox catalysts is observed at the beginning of the reaction during which the redox catalyst has a higher oxidation state.

Addition of the Phase Change Materials (PCMs) to Maintain Stable Operating Temperature Due to the dynamic nature of chemical looping processes and the highly endothermic/exothermic reactions happen during the processes, maintaining a stable operating temperature throughout both reactors is very challenging and often required a solid heat transfer medium to transfer heat between the two interconnected reactors. The Latent heat storage (LHS) which is based on the release and storage of latent heat when a phase change material (PHS) experiences a solid-solid or solid-liquid phase transition offers some advantages over the common temperature control techniques: 1. its latent heat offers a higher heat capacity compared to the most ceramic materials used as the support in redox catalyst, which reduce the solid circulation rates dominated by the heat integration requirements of the process; 2. it can store and release heat an elevated phase transition temperature; and 3. it offers good recyclability due to its reversible phase changing process. The PCMs with proper phase transition temperatures, can be mixed with the highly selective and active redox catalyst proposed, to maintain a more stable temperature throughout the reactors.

Encapsulation of the PCMs is crucial for its practical application in chemical looping processes as they often undergo solid-liquid transformation during the processes. It also provides more surface area for heat transfer which enhances their efficiencies. Recent studies showed that by use of different alloys such as alloys of aluminum-silica we can prepare PCMs with tunable phase transition temperatures. By encapsulating these PCMs is stable oxide shells such as $Al_2O_3$, they can be engineered into stable core-shell articles that can be conveniently handled and easily mixed with redox catalyst for more effective heat integration and temperature control.

Long Term Redox Experiments

Figure 8:
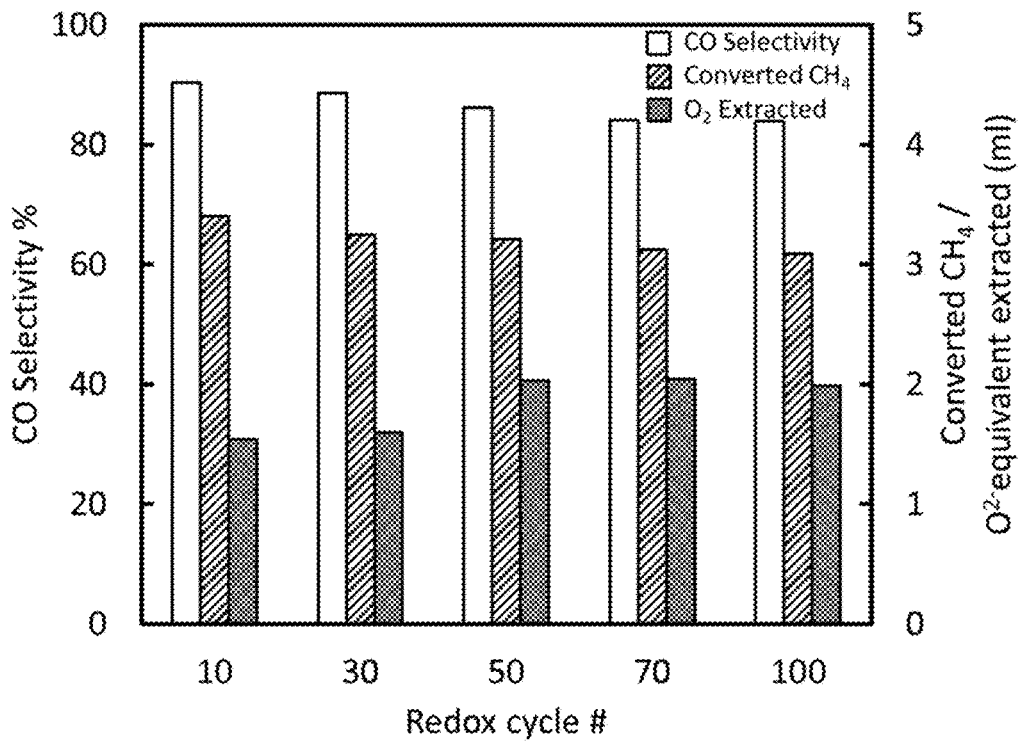
FIG. 8 is a graph of selectivity, converted methane, and $O_2$ extracted during 100 redox cycles at 600° C. on the 0.5 wt. % Rh-promoted $CaMnO_3$.
Figure 9A:
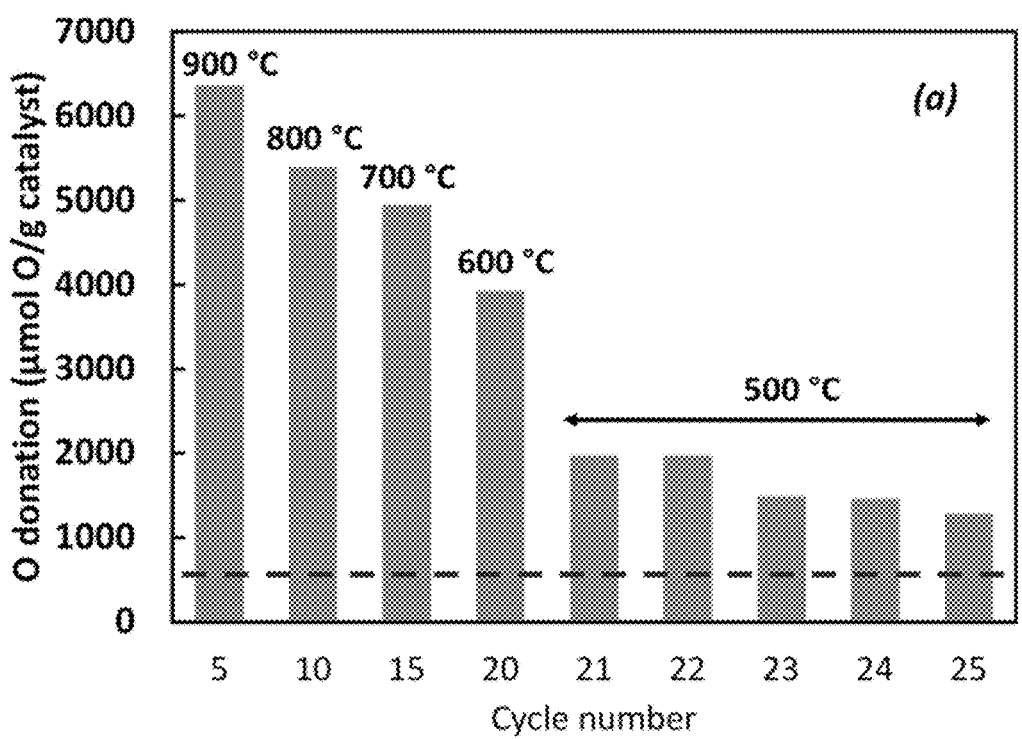
FIGS. 9A-9B are bar graphs of the accessible oxygen storage capacity of Rh-promoted $CaMnO_3$ redox catalyst (FIG. 9A) at different temperatures and (FIG. 9B) after extended cycles at 600° C.
Figure 9B:
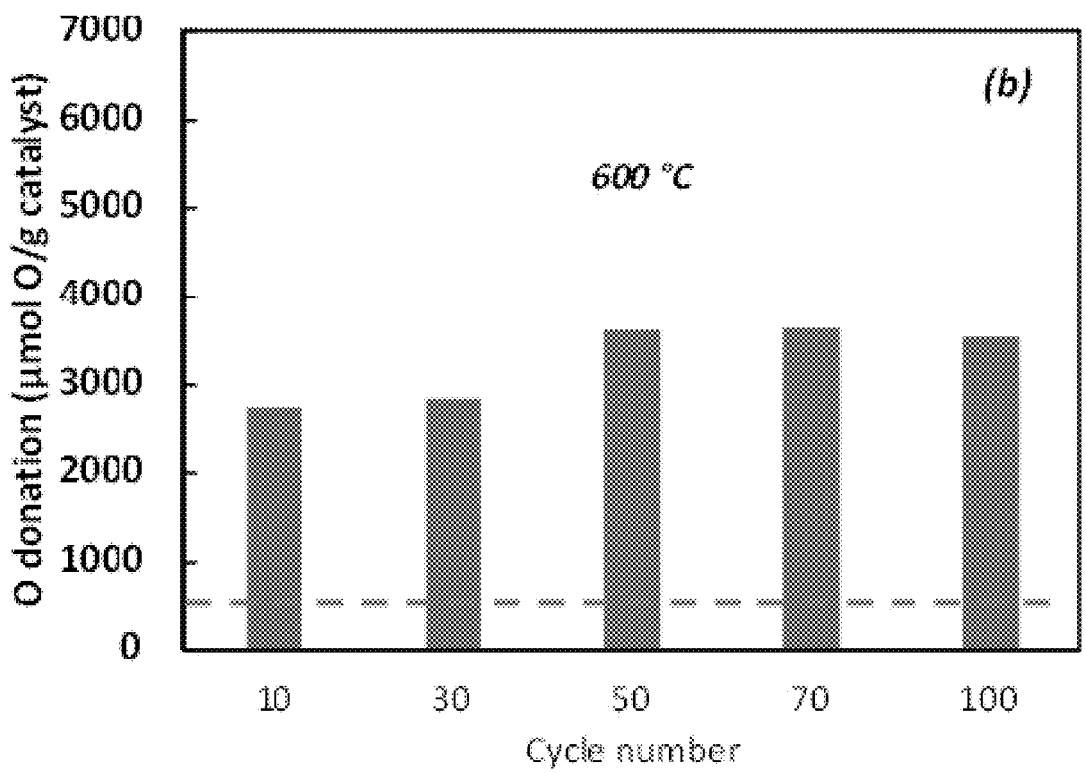

The aforementioned findings indicate that significantly higher syngas selectivity, lower coke formation and lower operating temperatures can be achieved by surface modification of the redox catalysts through addition of platinum group metals on their surfaces. To validate the long term performance of such redox catalysts, Rh-promoted $CaMnO_3$ is tested for extended redox cycles at 600° C. In this experiment 10 Vol. % oxygen is used as FIG. 8 shows the selectivity and methane conversion of the catalyst through 100 complete redox cycles. The redox catalyst exhibits good redox activity throughout the 100 redox cycles. Syngas selectivity was maintained at above 94% throughout the 100 cycles. Slight decrease in syngas productivity and oxygen carrying capacity was observed, which may have resulted from sintering the redox catalyst. At the 100$^{th}$ cycle, the sample exhibited a syngas productivity of 7.9 mmol syngas per gram redox catalyst at 600° C. To compare, a recently reported perovskite based redox catalyst exhibits 4.8 mmol/g syngas productivity at 900° C.

Oxygen Storage Capacity and Applications in Automotive Exhaust Treatment

Figure 10A:
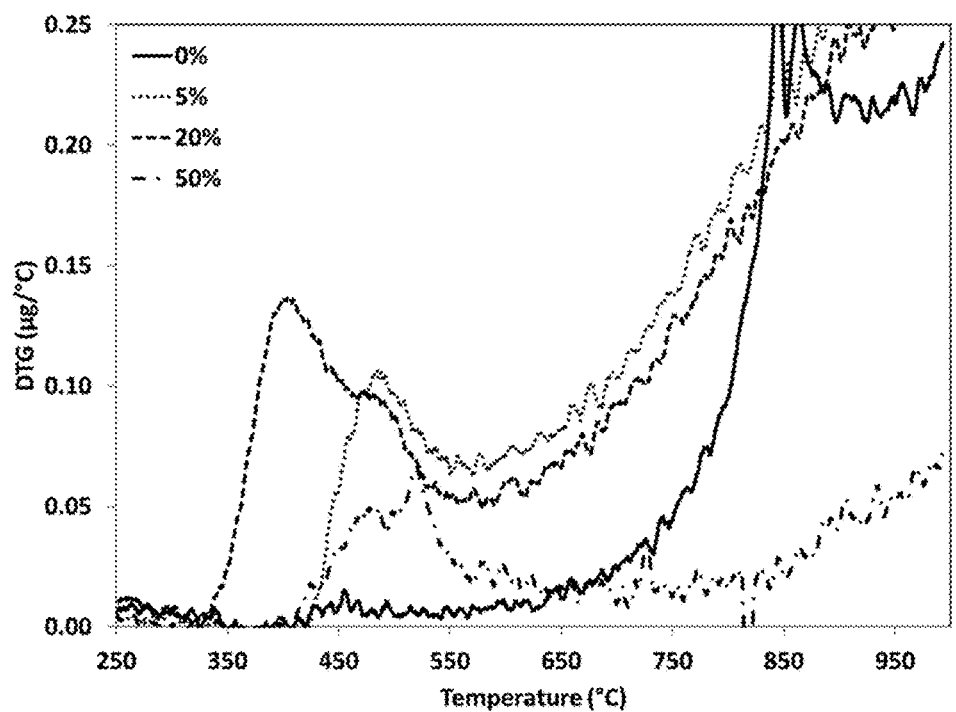
FIG. 10A is a graph of the oxygen temperature programmed desorption of $CaMn_{1-y}Fe_yO_{3-\delta}$ with varying iron dopant level.
Figure 10B:
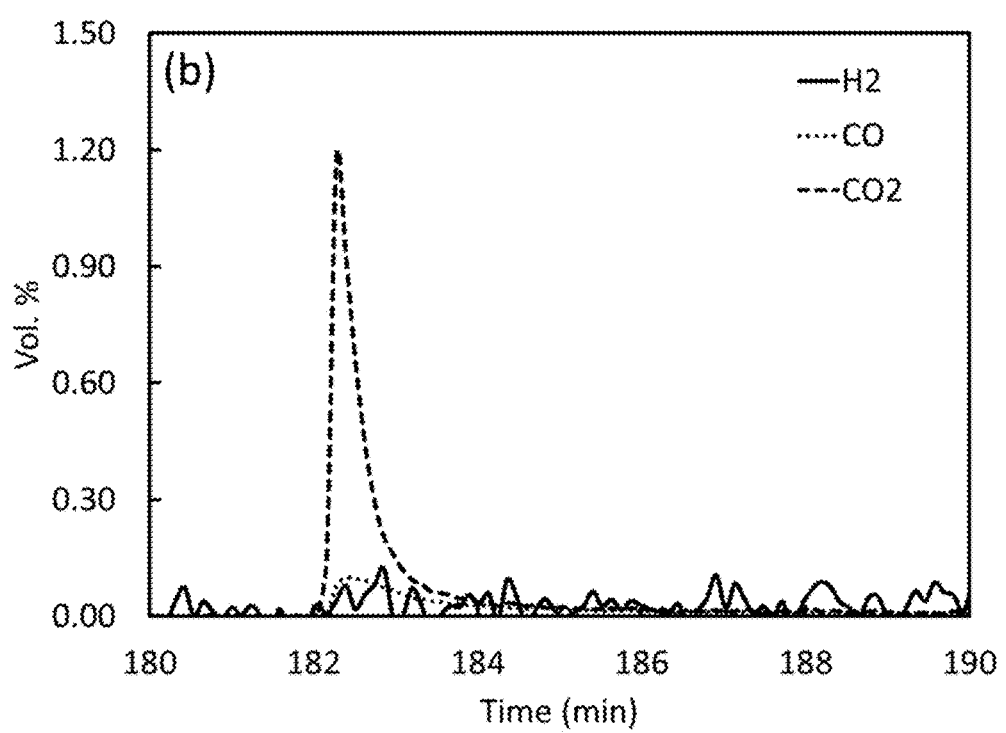
FIG. 10B is a graph of the product distribution during the methane oxidation half cycle using 2 wt. % Pd promoted $CaMnO_3$ and 10 Vol. % methane (balance Ar) at 600° C.

Given the promising low temperature performance and considerable oxygen capacity of the studied $CaMnO_3$-based mixed oxides, they can be used for variety of other applications, namely automotive catalytic convertors. Modern three way catalysts (TWCs), used in automotive industry to remove harmful gases such as CO and NOx, need to meet the challenges of increasingly stringent environmental regulations, limited material availability, and catalyst deactivation at severe exhaust conditions. Although advanced combustion regimes such as gasoline compression-ignition (GCI) offer excellent potential to increase fuel combustion efficiency, they create additional challenges in emission control catalysis since these engines often run under air-to-fuel ratios (A/F) away from the stoichiometry, posing more stringent requirements on the performance of oxygen storage materials (OSMs). Our research has led to the discovery of ceria-free perovskite OSMs with superior oxygen storage capacity (OSC, over 1,000 μmol O/g at 500° C., initial $O_2$ release at 330° C., FIG. 10a). The OSMs exhibit superior stability under high temperature and cyclic redox conditions. Loading small amounts of platinum group metal (equivalent to ~2.65 g/ft$^3$ monolith) on such OSMs leads to outstanding activities for hydrocarbon (HC) oxidation. This is apparent in the high $CO_2$ selectivity (~78%) and oxygen capacity (>1800 μmol O/g) of the 2 wt. % Pd promoted $CaMnO_3$ during methane oxidation half cycle at 600° C. These findings are useful for fabrication of advanced emission control systems for compression-ignition gasoline engines.

CONCLUDING REMARKS

Significant enhancements in the redox activity and syngas selectivity are observed for mixed oxide-based redox catalysts after addition of 0.5 w.t. % Rh. Experimental studies indicate that conduction of bulk lattice oxygen to the oxide surface limits the overall redox reaction rate. Meanwhile, syngas selectivity is determined by the type and abundance of surface oxygen species, which are determined by the relative rates of bulk oxygen conduction and surface oxygen removal under the dynamic redox reactions. Isotope exchange, XPS, and DRIFTS studies confirm the presence and enrichment of Rh on the surface, which is shown to significantly enhance methane C—H bond activation. This leads to higher concentrations of surface $CH_x$ species for facile oxygen extraction from the surface. The more oxygen-deprived surface in the presence of Rh imposes a higher oxygen chemical potential gradient between the oxide bulk and surface, thereby resulting in enhanced $O^{2-}$ conduction through the bulk of the redox catalyst. As a result, higher redox activity as well as increased oxygen donation and selectivity were observed for Rh promoted redox catalysts at temperatures as low as 500° C. When compared to unpromoted $CaMnO_3$ which demonstrates 2.4 mmol/g syngas productivity at 900° C., the Rh-promoted $CaMnO_3$ produces syngas at 7.9 mmol/g at 600° C. with satisfactory long-term redox performance.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A method of converting methane to syngas, the method comprising contacting the methane with a redox catalyst to produce the syngas,
    wherein the redox catalyst comprises metal cations and is (1) a cerium containing oxide or (2) a perovskite oxide comprising La, Ba, Sr, Ca, or any combination thereof;
    wherein the redox catalyst is in a fixed bed reactor having a first end and a second end;
    wherein the redox catalyst nearest the first end is initially at a first high average oxidation state and the redox catalyst nearest the second end is initially at a second low average oxidation state lower than the first high average oxidation state, and
    wherein the method comprises:
    (1) introducing the methane into the fixed bed reactor near the first end for a first period of time; wherein the methane contacts the redox catalyst in the first high average oxidation state near the first end of the fixed bed reactor; and
    wherein after the first period of time the redox catalyst nearest the first end is in a third low average oxidation state;
    (2) introducing a first amount of an oxidant into the fixed bed reactor near the second end for a second period of time; and
    wherein after the second period of time the redox catalyst near the second end is in a fourth high average oxidation state higher than the third low average oxidation state;
    (3) introducing the methane into the fixed bed reactor near the second end for a third period of time; wherein the methane contacts the redox catalyst in the fourth high average oxidation state near the second end of the fixed bed reactor; and
    wherein after the third period of time the redox catalyst nearest the second end is in a fifth low average oxidation state; and
    (4) introducing a second amount of the oxidant into the fixed bed reactor near the first end for a fourth period of time; and
    wherein after the fourth period of time the redox catalyst near the first end is in a sixth high average oxidation state higher than the fifth low average oxidation state.

2. The method according to claim 1, wherein the methane is contacted with the redox catalyst at a temperature of 400° C. to 950° C.

3. The method according to claim 1, wherein the oxidant comprises air or an oxygen containing gas.

4. The method according to claim 1, further comprising regenerating the redox catalyst by contacting the redox catalyst with the oxidant selected from the group consisting of water, carbon dioxide, and a mixture thereof in a presence of an external energy source.

5. The method according to claim 4, wherein the external energy source is solar thermal radiation or industrial waste heat or combination thereof.

6. The method according to claim 5, wherein the regeneration step produces $H_2$, CO, or a mixture thereof.

7. The method according to claim 1, wherein the redox catalyst is in multiple coupled fixed-bed reactors, and the method further comprises alternating feed streams between
   (1) a first feed stream comprising the methane, and
   (2) a second feed stream comprising carbon dioxide, water, or a mixture thereof.

8. The method according to claim 7, wherein contacting the redox catalyst with the second feed stream regenerates the redox catalyst.

9. The method according to claim 7, wherein contacting the redox catalyst with the second feed stream produces $H_2$, CO, or a mixture thereof.

10. The method according to claim 8, wherein the redox catalyst is in sequential or mixed bed of redox catalyst with a reforming catalyst.

11. The method according to claim 10, wherein the reforming catalyst is a nickel or platinum group metal supported on a refractory support material such as alumina, silica, or spinel.

12. The method according to claim 1, wherein redox catalyst is mixed with a phase change material (PCM) in the fixed bed reactor to maintain stable operating temperatures throughout the fixed bed reactor.

13. The method according to claim 12, wherein the PCM is an alloy containing aluminum encapsulated in an alumina containing shell.

14. The method according to claim 1, wherein the redox catalyst comprises Rh-promoted $CaMnO_{3-\delta}$, wherein $\delta$ is 0.0 to 0.91.

15. The method according to claim 1, wherein the redox catalyst B comprises Rh-promoted $LaCeO_{3-\delta}$, wherein $\delta$ is −0.5 to 0.41.

16. The method according to claim 1, wherein the redox catalyst further comprises a metal cation selected from the group consisting of Fe, Ni, Mn, Al, Ti, and Cu.

17. The method according to claim 1, wherein the redox catalyst comprises $CaMn_yFe_{1-y}O_3$, wherein y is from 0.75 to 0.95.

18. The method according to claim 1, wherein the redox catalyst comprises $Ca_xSr_{1-x}MnO_3$, wherein x is from 0.75 to 0.95.

19. The method according to claim 1, wherein the redox catalyst has an outer surface comprising greater than 0 wt. % to 5 wt. % of a platinum-group metal based upon a total weight of the redox catalyst.

20. The method according to claim 19, wherein the platinum-group metal comprises rhodium, platinum, osmium, iridium, ruthenium, palladium, or a combination thereof.

21. The method according to claim 1, wherein the first high average oxidation state, the fourth high average oxidation state, and the sixth high average oxidation state are substantially the same average oxidation state.

22. The method according to claim 1, wherein the second low average oxidation state, the third low average oxidation state, and the fifth low average oxidation state are substantially the same average oxidation state.

23. The method according to claim 1, where the redox catalyst comprises a mixture of a first redox catalyst having a first chemical formula and a second redox catalyst having a second chemical formula different from the first chemical formula.

24. The method according to claim 1, further comprising purging the fixed bed reactor between steps (1) and (2), between steps (2) and (3), between steps (3) and (4), or any combination thereof; wherein the purging comprises introducing an inert gas, a steam, or a combination thereof into the fixed bed reactor.

25. The method according to claim 1, wherein steps (1)-(4) are repeated to convert additional methane.

26. The method according to claim 1, wherein the methane is a component of a gaseous composition, wherein the methane is at least 5% by volume of the gaseous composition.

* * * * *